(12) United States Patent
Ito et al.

(10) Patent No.: US 12,007,303 B2
(45) Date of Patent: Jun. 11, 2024

(54) SEAL STATE DETECTING DEVICE AND SEAL STATE DETECTING METHOD

(71) Applicant: Hitachi Astemo, Ltd., Ibaraki (JP)

(72) Inventors: Takanori Ito, Hitachinaka (JP); Takayuki Ohno, Hitachinaka (JP); Masafumi Iwamoto, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 295 days.

(21) Appl. No.: 17/639,372

(22) PCT Filed: Aug. 25, 2020

(86) PCT No.: PCT/JP2020/032039
§ 371 (c)(1),
(2) Date: Mar. 1, 2022

(87) PCT Pub. No.: WO2021/059828
PCT Pub. Date: Apr. 1, 2021

(65) Prior Publication Data
US 2022/0276117 A1 Sep. 1, 2022

(30) Foreign Application Priority Data
Sep. 26, 2019 (JP) .................................. 2019-175409

(51) Int. Cl.
*G01M 3/04* (2006.01)
*G01M 3/28* (2006.01)
(Continued)

(52) U.S. Cl.
CPC ............ *G01M 3/04* (2013.01); *G01M 3/2869* (2013.01)

(58) Field of Classification Search
CPC .... G01M 3/04; G01M 3/2869; G01M 13/005; G01M 3/26; G01M 3/20; F16J 15/00; F16F 9/36; F16F 9/43; F17C 5/06
See application file for complete search history.

(56) References Cited

U.S. PATENT DOCUMENTS

2018/0172035 A1* 6/2018 Simonneaux ........... B64C 25/58

FOREIGN PATENT DOCUMENTS

| CN | 109027095 A | * 12/2018 | ................ F16F 9/10 |
| JP | 62-46956 Y2 | 12/1987 | |

(Continued)

OTHER PUBLICATIONS

International Search Report received in corresponding International Application No. PCT/JP2020/032039 dated Nov. 10, 2020.

(Continued)

*Primary Examiner* — Herbert K Roberts
*Assistant Examiner* — Anthony W Megna Fuentes
(74) *Attorney, Agent, or Firm* — MATTINGLY & MALUR, PC

(57) ABSTRACT

This seal state detection device includes a plurality of part case members including a cylinder facing part and a rod facing part and are aligned in a circumferential direction of a cylinder by causing the cylinder facing part to face the cylinder and the rod facing part to face a rod so that a housing chamber for housing a part of the cylinder and a part of the rod is formed between the cylinder facing part and the rod facing part. The cylinder facing part includes a seal part which contacts with the cylinder. The seal part includes a protruding part formed at one end and a recessed part formed at the other end in the circumferential direction of the cylinder. The protruding part and the recessed part are fitted to each other when the plurality of part case members are aligned in the circumferential direction of the cylinder.

6 Claims, 11 Drawing Sheets

(51) Int. Cl.
*G01M 13/005* (2019.01)
*F16F 9/36* (2006.01)
*F16J 15/00* (2006.01)
*G01M 3/26* (2006.01)

(56) References Cited

FOREIGN PATENT DOCUMENTS

| | | |
|---|---|---|
| JP | 11-264780 A | 9/1999 |
| JP | 2002-22590 A | 1/2002 |
| WO | 2019/004087 A1 | 1/2019 |

OTHER PUBLICATIONS

Written Opinion received in corresponding International Application No. PCT/JP2020/032039 dated Nov. 10, 2020.
Indian Office Action received in corresponding Indian Application No. 202217010871 dated Apr. 29, 2022.

* cited by examiner

SEAL STATE DETECTING DEVICE AND SEAL STATE DETECTING METHOD

TECHNICAL FIELD

The present invention relates to a seal state detection device and a seal state detection method for a cylinder device.

Priority is claimed on Japanese Patent Application No. 2019-175409 filed on Sep. 26, 2019, the contents of which are incorporated herein by reference.

BACKGROUND ART

There is a device for detecting a seal abnormality of a damper device (see, for example, Patent Document 1). Also, as a pressurized gas filling device, there is a device using a box-shaped sealed type that opens on one side (see, for example, Patent Document 2).

CITATION LIST

Patent Document

[Patent Document 1]
    Japanese Unexamined Patent Application, First Publication No. H11-264780
[Patent Document 2]
    Japanese Examined Utility Model Application, Second Publication No. S62-46956

SUMMARY OF INVENTION

Technical Problem

In a device for detecting a seal state of a cylinder device, it is required to increase a degree of freedom in timing of inspection.

An objective of the present invention is to provide a seal state detection device and a seal state detection method in which a degree of freedom in timing of inspection can be increased.

Solution to Problem

In order to achieve the above-described objective, the present invention employs the following aspects.

One aspect of the present invention is a seal state detection device detecting a seal state of a seal member of a cylinder device having a cylinder in which a working fluid is sealed, a rod protruding from at least one end of the cylinder to be extendable and contractible, and the seal member provided between the cylinder and the rod, and the seal state detection device includes a plurality of part case members having a cylinder facing part and a rod facing part and disposed to be aligned in a circumferential direction of the cylinder by causing the cylinder facing part to face the cylinder and the rod facing part to face the rod so that a housing chamber for housing a part of the cylinder and a part of the rod is formed between the cylinder facing part and the rod facing part, in which the cylinder facing part includes a seal part that comes into contact with the cylinder, the seal part includes a protruding part formed at one end and a recessed part formed at the other end in the circumferential direction of the cylinder, and the protruding part and the recessed part facing in the circumferential direction of the cylinder are fitted to each other when the plurality of part case members are disposed to be aligned in the circumferential direction of the cylinder.

Also, another aspect of the present invention is a seal state detection method for detecting a seal state of the seal member of the cylinder device using the seal state detection device of the above-described aspect, and the seal state detection method includes a housing chamber forming step of forming a housing chamber for housing a part of the cylinder and a part of the rod between the cylinder facing part and the rod facing part by disposing the plurality of part case members to be aligned in a circumferential direction of the cylinder, a decompression step of bringing the inside of the housing chamber into a decompressed state in which a pressure thereof is reduced by a predetermined pressure from atmospheric pressure, and an abnormality detection step of detecting an abnormality on the basis of the pressure in the housing chamber that has been brought into the decompressed state in the decompression step.

Advantageous Effects of Invention

According to the above-described aspects of the present invention, a degree of freedom in timing of inspection can be increased.

DESCRIPTION OF EMBODIMENTS

An embodiment and modified examples of a seal state detection device and a seal state detection method of the present invention will be described below with reference to the drawings.

Figure 1:
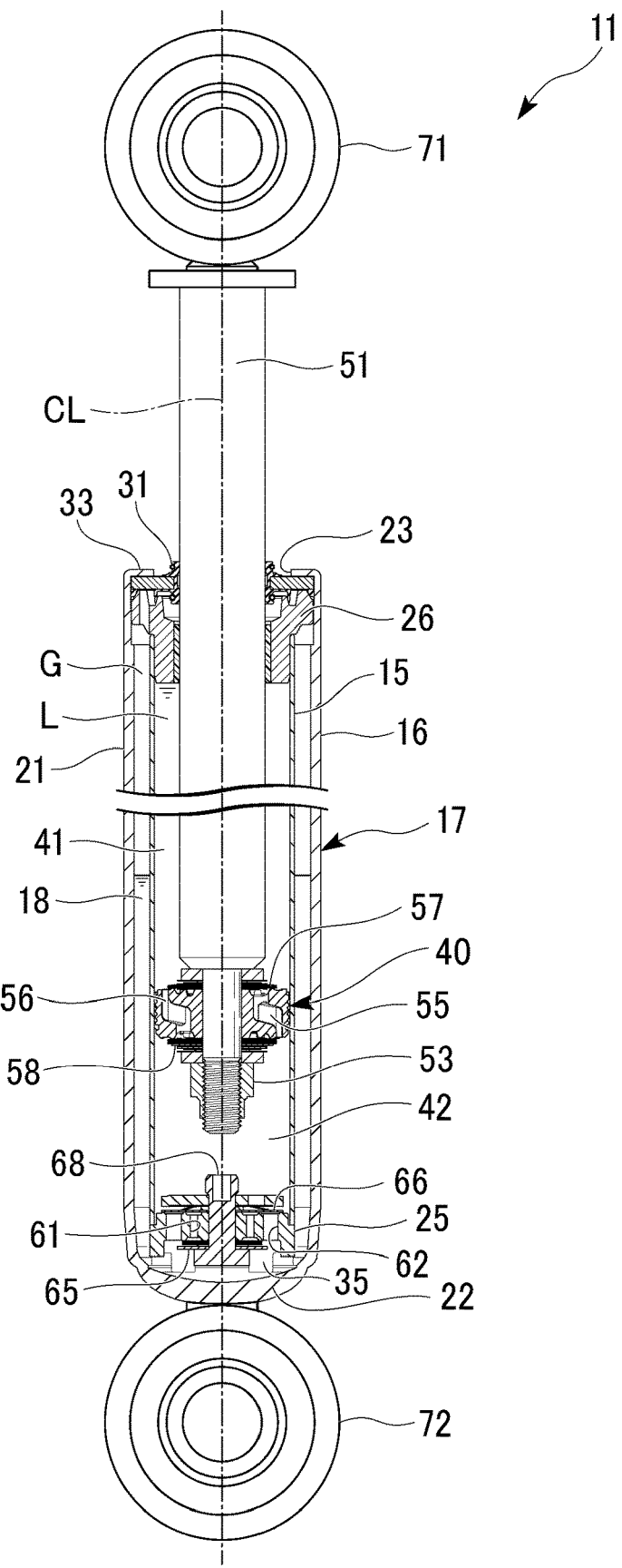
FIG. 1 is a view illustrating a cylinder device in which a seal state is detected by a seal state detection device and a seal state detection method according to one embodiment of the present invention, and is a longitudinal sectional view seen in a cross section including a central axis CL.

FIG. 1 illustrates a cylinder device 11 in which a seal state is detected by the seal state detection device and the seal state detection method of one embodiment of the present invention. The cylinder device 11 is a shock absorber used in a suspension device of a vehicle such as an automobile or a railway vehicle. The cylinder device 11 is a shock absorber of a dual-tube type including a cylinder 17 having a cylindrical inner tube 15 and a bottomed cylindrical outer tube 16 which has a diameter larger than that of the inner tube 15 and is provided on an outer circumferential side of the inner tube 15. A space between the outer tube 16 and the inner tube 15 serves as a reservoir chamber 18. Reference sign CL in FIG. 1 indicates a central axis of the cylinder device 11. The same applies to other drawings. Each central axis to be described in the following description is basically coaxial with the central axis CL.

The outer tube 16 is an integrally formed product formed of one metal member, and includes a cylindrical barrel part 21, a bottom part 22 that closes one end portion side of the barrel part 21 in an axial direction, and an opening 23 on a side of the barrel part 21 opposite to the bottom part 22. In other words, the outer tube 16 covers the inner tube 15, one end thereof in the axial direction is closed, and the other end in the axial direction is open. The opening 23 of the outer tube 16 opens toward the outside of the cylinder device 11. Therefore, the opening 23 is an opening to the outside also in the cylinder 17.

The cylinder device 11 includes an annular valve body 25 fitted to an inner circumferential portion of one end of the inner tube 15 in the axial direction, and an annular rod guide 26 fitted to an inner circumferential portion of the other end of the inner tube 15 in the axial direction. The valve body 25 is placed in a state in which it is positioned in a radial direction with respect to the bottom part 22 of the outer tube 16. The rod guide 26 is fitted to the inner circumferential portion of the barrel part 21 of the outer tube 16 to be positioned in the radial direction. Here, a space between the valve body 25 and the bottom part 22 allows the inner tube 15 and the outer tube 16 to communicate with each other via a passage groove 35 formed in the valve body 25, and forms the reservoir chamber 18 similarly in the space between the inner tube 15 and the outer tube 16.

The cylinder device 11 includes an annular seal member 31. The seal member 31 is provided at a position on the rod guide 26 on a side opposite to a side facing the bottom part 22. The seal member 31 is also fitted to the inner circumferential portion of the barrel part 21 similarly to the rod guide 26. A swaged part 33 in which the barrel part 21 is plastically deformed inward in a radial direction by swaging processing such as curling processing is formed at an end portion of the barrel part 21 on a side opposite to the bottom part 22. The seal member 31 is sandwiched between the swaged part 33 and the rod guide 26. The seal member 31 is one for closing the cylinder 17 by closing the opening 23 of the outer tube 16, and is specifically an oil seal. Further, the seal member 31 may be formed of a seal washer.

The cylinder device 11 includes a piston 40 provided in the cylinder 17. The piston 40 is fitted in the inner tube 15 to be slidable. The piston 40 partitions the inside of the inner tube 15 into two chambers including a first chamber 41 and a second chamber 42. The first chamber 41 is provided between the piston 40 and the rod guide 26 in the inner tube 15. The second chamber 42 is provided between the piston 40 and the valve body 25 in the inner tube 15. The second chamber 42 is divided from the reservoir chamber 18 by the valve body 25. The first chamber 41 and the second chamber 42 are filled with an oil fluid L as a working fluid. The reservoir chamber 18 is filled with a gas G and the oil fluid L as working fluids. Therefore, the working fluid is sealed in the cylinder 17.

The cylinder device 11 includes a rod 51 having one end side connected to the piston 40 and the other end side extending from the cylinder 17 to the outside through the opening 23 of the outer tube 16. The piston 40 is connected to the rod 51 by a nut 53. The rod 51 extends to the outside from the inner tube 15 and the outer tube 16 through the rod guide 26 and the seal member 31. The rod 51 is guided by the rod guide 26 and moves in the axial direction with respect to the cylinder 17. Therefore, the rod 51 protrudes from one end of the cylinder 17 to be expandable and contractible.

The seal member 31 is provided between the opening 23 of the outer tube 16 of the cylinder 17 and the rod 51 and closes a space between them. The seal member 31 restricts leakage of the oil fluid L in the inner tube 15 and the gas G and the oil fluid L in the reservoir chamber 18 to the outside of the cylinder device 11.

A passage 55 and a passage 56 penetrating in the axial direction (a direction along the axis CL) are formed in the piston 40. The passages 55 and 56 allow the first chamber 41 and the second chamber 42 to communicate with each other. The cylinder device 11 includes an annular disc valve 57 capable of closing the passage 55 by coming into contact with the piston 40 on a side of the piston 40 opposite to a side facing the bottom part 22 in the axial direction. Also, the cylinder device 11 includes an annular disc valve 58 capable of closing the passage 56 by coming into contact with the piston 40 on the bottom part 22 side of the piston 40 in the axial direction. The disc valves 57 and 58 are connected to the rod 51 together with the piston 40.

In a case in which the rod 51 moves to a compression side that increases an amount of entry into the inner tube 15 and the outer tube 16, when the piston 40 moves in a direction in which the second chamber 42 is reduced and a pressure in the second chamber 42 becomes higher than a pressure in the first chamber 41 by a predetermined value or more, the passage 55 is opened to allow the oil fluid L in the second chamber 42 to flow into the first chamber 41. In this way, the disc valve 57 causes a damping force to be generated at that time. In a case in which the rod 51 moves to an extension side that increases an amount of protrusion from the inner tube 15 and the outer tube 16, when the piston 40 moves in a direction in which the first chamber 41 is reduced and a pressure in the first chamber 41 becomes higher than a pressure in the second chamber 42 by a predetermined value or more, the passage 56 is opened to allow the oil fluid L in the first chamber 41 to flow into the second chamber 42. In this way, the disc valve 58 causes a damping force to be generated at that time.

A fixed orifice (not illustrated) that allows the first chamber 41 and the second chamber 42 to communicate with each other via the passage 55 even in a state in which the disc valve 57 has closed the passage 55 to the maximum is formed in at least one of the piston 40 and the disc valve 57. Also, a fixed orifice (not illustrated) that allows the first chamber 41 and the second chamber 42 to communicate with each other via the passage 56 even in a state in which the disc valve 58 has closed the passage 56 to the maximum is formed in at least one of the piston 40 and the disc valve 58.

A passage 61 and a passage 62 penetrating in the axial direction are formed in the valve body 25. The passages 61 and 62 allow the second chamber 42 and the reservoir chamber 18 to communicate with each other. An annular disc valve 65 capable of closing the passage 61 by coming into contact with the valve body 25 is provided on the bottom part 22 side of the valve body 25 in the axial direction. Also, an annular disc valve 66 capable of closing the passage 62 by coming into contact with the valve body 25 is provided on a side of the valve body 25 opposite to the bottom part 22 side in the axial direction. A fixing pin 68 is fitted into a center of the valve body 25 in the radial direction. The disc valves 65 and 66 are connected to the valve body 25 by the fixing pin 68.

In a case in which the rod 51 moves to the compression side, when the piston 40 moves in a direction in which the second chamber 42 is reduced and a pressure in the second chamber 42 becomes higher than a pressure in the reservoir chamber 18 by a predetermined value or more, the disc valve 65 opens the passage 61. In this way, the disc valve 65 causes a damping force to be generated at that time. In a case in which the rod 51 moves to the extension side, when the piston 40 moves to the first chamber 41 side and a pressure in the second chamber 42 becomes lower than a pressure in the reservoir chamber 18, the disc valve 66 opens the passage 62. The disc valve 66 at that time is a suction valve that allows the oil fluid L to flow from the reservoir chamber 18 into the second chamber 42 without substantially generating a damping force.

A mounting eye 71 is fixed to an end portion of the rod 51 on a side opposite to a side on which the cylinder 17 is positioned by welding. A mounting eye 72 is fixed to an outer side of the bottom part 22 of the outer tube 16, which is an end portion of the cylinder 17 on a side opposite to a side on which the rod 51 is positioned, by welding. Outer diameters of these mounting eyes 71 and 72 are larger than an outer diameter of the barrel part 21 of the outer tube 16 of the cylinder 17. In other words, the mounting eye 71 protrudes outward in the radial direction of the rod 51 from the rod 51 in a state in which it is attached to the rod 51.

In the present embodiment, the cylinder device 11 in a state after the mounting eyes 71 and 72 are attached is inspected. Specifically, the seal state detection device and the seal state detection method of the present embodiment detect a seal state of the seal member 31 that seals between the opening 23 of the outer tube 16 of the cylinder 17 and the rod 51.

Figure 2:
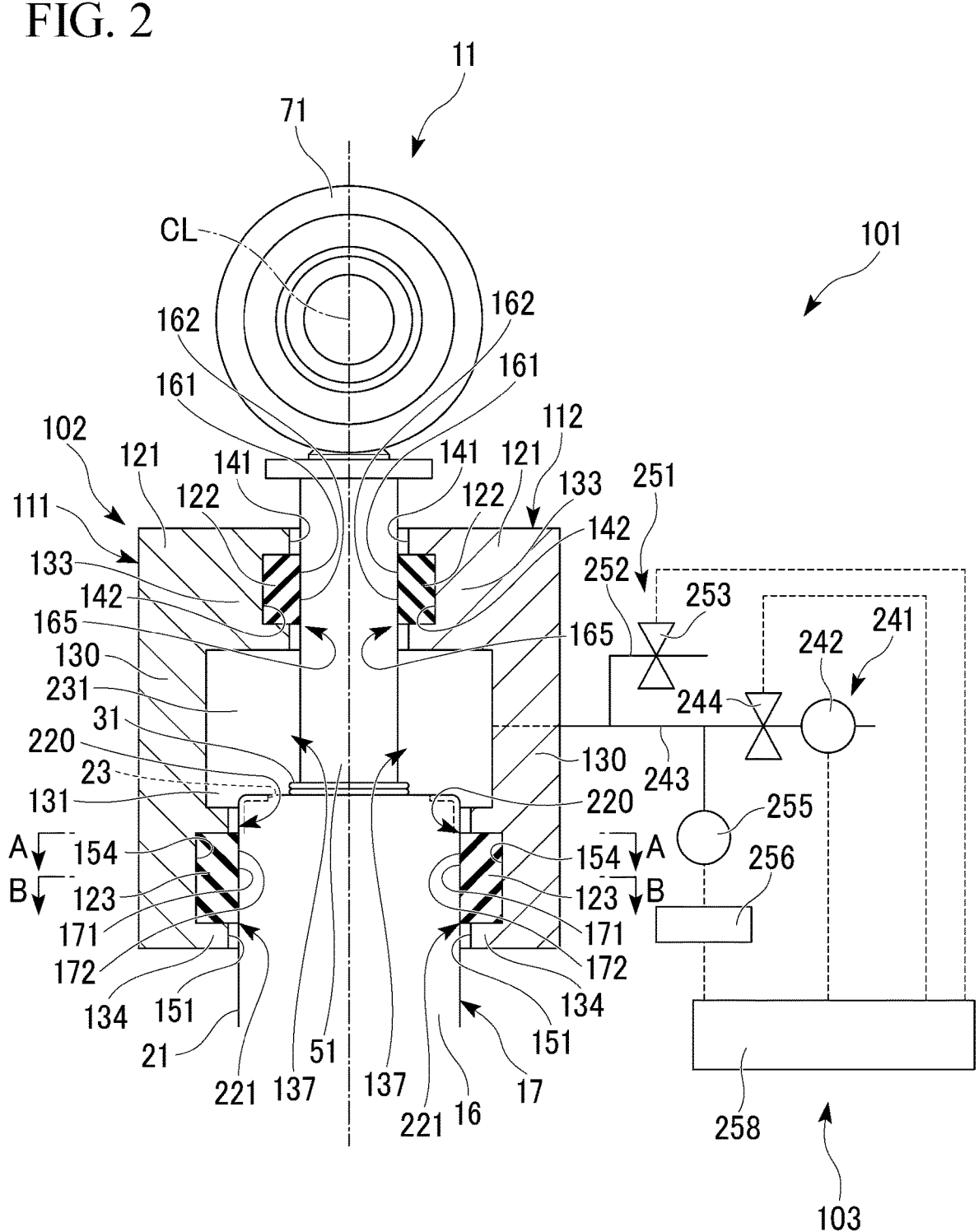
FIG. 2 is a configuration view illustrating the seal state detection device of the embodiment.

As illustrated in FIG. 2, the seal state detection device 101 of the present embodiment includes a chamber 102 that covers and seals the opening 23 side of the cylinder 17 and the seal member 31 of the cylinder device 11, and a detection device main body part 103 that detects an abnormality in a seal state due to the seal member 31 from a state inside the chamber 102.

The chamber 102 covers and seals the opening 23 side of the cylinder 17, the seal member 31, and a portion of the rod 51 extending to the outside of the cylinder 17 from the seal member 31. The chamber 102 is a split type including a plurality of, specifically two part case members 111 and 112. The two part case members 111 and 112 have substantially the same configuration as each other.

The part case member 111 includes a case member main body 121 made of a metal, a rubber rod seal 122 that is elastically deformable and has a sealing property, and a cylinder seal 123 made of similar rubber. Since the case member main body 121 is made of a metal, it has a higher rigidity than the rod seal 122 and the cylinder seal 123 made of rubber and is less likely to be deformed.

The case member main body 121 of the part case member 111 includes a main wall part 130, a pair (only one is illustrated in FIG. 2 because it is a cross-sectional view) of side wall parts 131, a rod facing flange part 133, and a cylinder facing flange part 134.

The main wall part 130 has a substantially flat plate shape and is disposed to extend in a vertical direction. The pair of side wall parts 131 both have a substantially flat plate shape, and extend from end edge portions on both sides of the main wall part 130 in a horizontal direction to the same side with respect to the main wall part 130 in a thickness direction of the main wall part 130.

The rod facing flange part 133 has a substantially flat plate shape and covers upper portions of the main wall part 130 and the pair of side wall parts 131 to connect upper end edge portions thereof. The rod facing flange part 133 has a shape that covers a space surrounded by the main wall part 130 and the pair of side wall parts 131 from above.

The cylinder facing flange part 134 has a substantially flat plate shape, and covers a lower side of the main wall part 130 and the pair of side wall parts 131 to connect lower end edge portions thereof. The cylinder facing flange part 134 has a shape that covers a space surrounded by the main wall part 130 and the pair of side wall parts 131 from below.

Therefore, the part case member 111 has a box shape having an opening 137 on a side opposite to a side on which the main wall part 130 is positioned.

A semicylindrical surface-shaped rod facing surface 141 that is recessed toward the main wall part 130 side is formed in the rod facing flange part 133 on the opening 137 side. A central axis of the rod facing surface 141 extends in the vertical direction. The rod facing surface 141 has an inner diameter slightly larger than an outer diameter of the rod 51. A rod seal fitting recessed part 142 that is recessed outward in a radial direction of the rod facing surface 141 from an intermediate position of the rod facing surface 141 in the axial direction is formed on the opening 137 side of the rod facing flange part 133.

Figure 3:
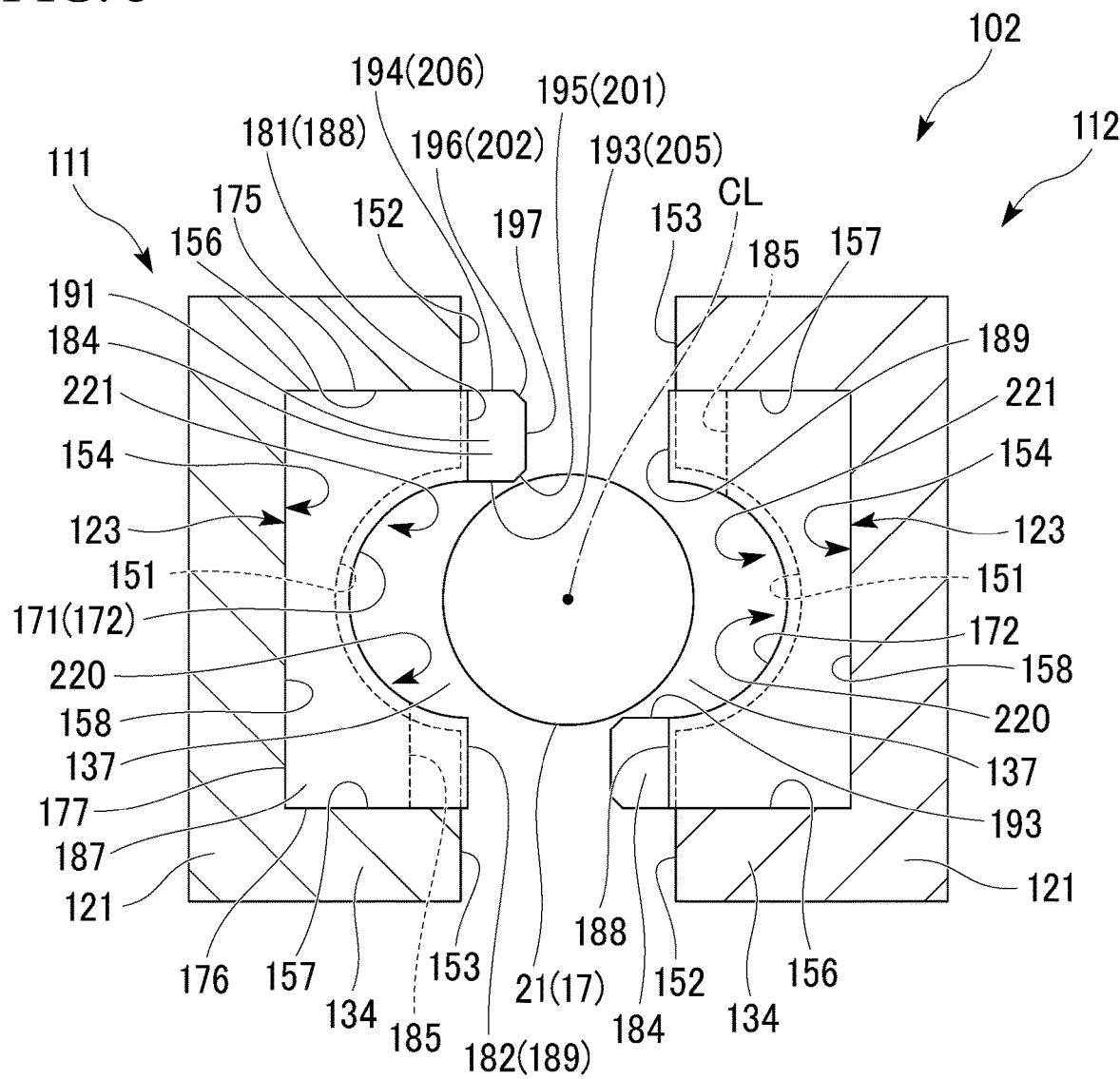
FIG. 3 is a view illustrating a chamber of the seal state detection device and is a plan sectional view along line A-A of FIG. 2.
Figure 4:
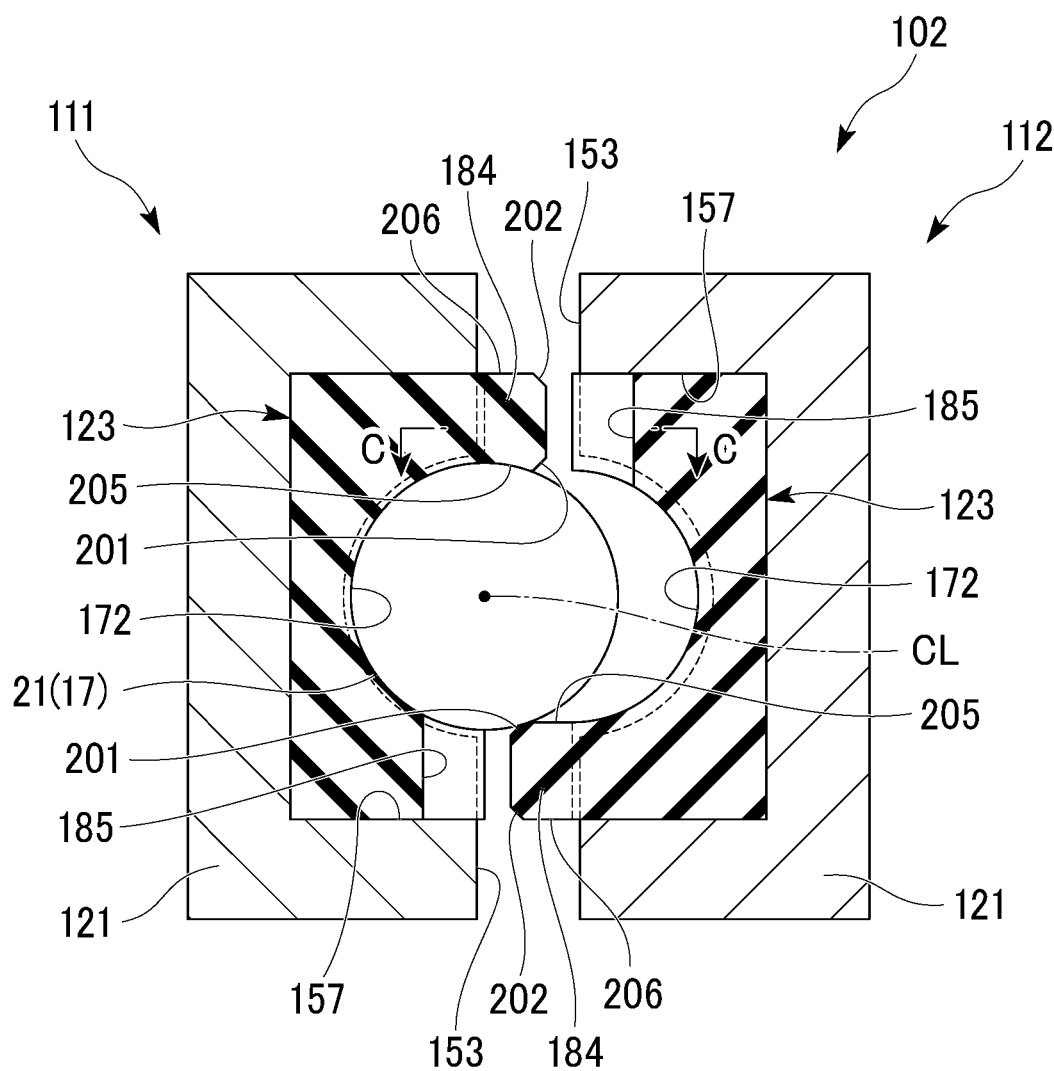
FIG. 4 is a view illustrating the chamber of the seal state detection device and is a plan sectional view along line B-B of FIG. 2.
Figure 5:
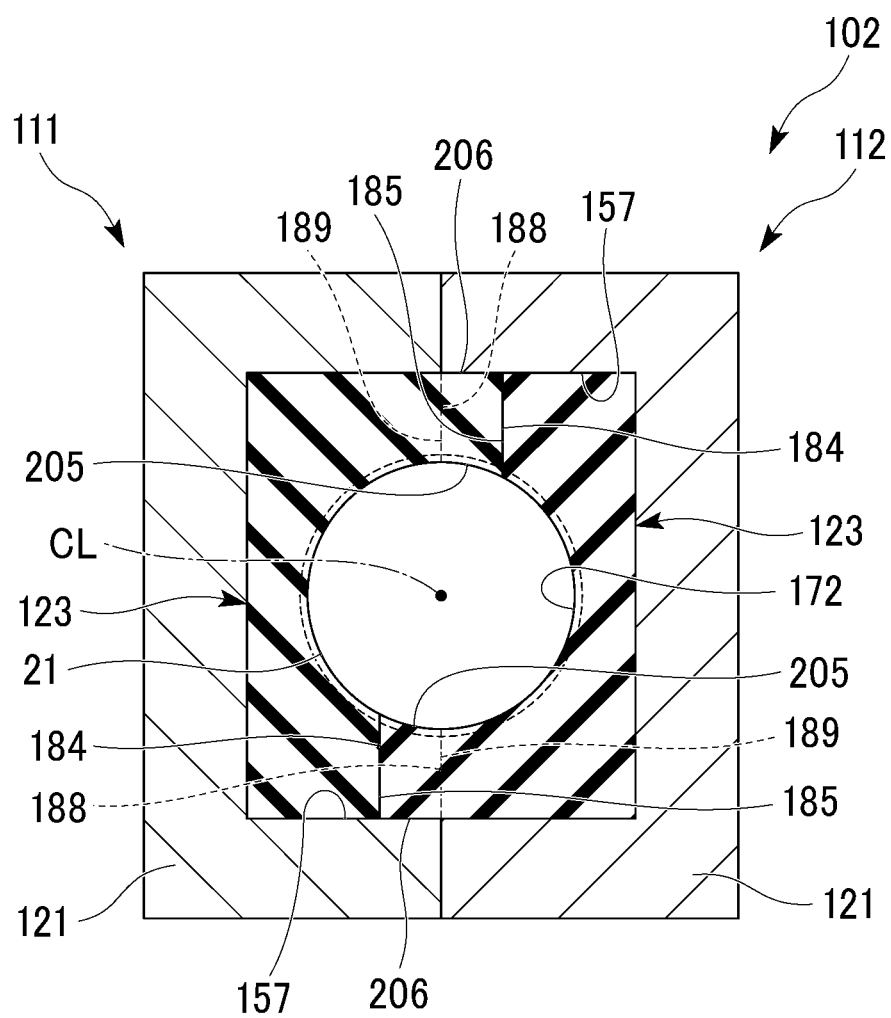
FIG. 5 is a view illustrating the chamber of the seal state detection device and is a plan sectional view along line B-B of FIG. 2.

A semicylindrical surface-shaped cylinder facing surface 151 that is recessed toward the main wall part 130 side is formed in the cylinder facing flange part 134 on the opening 137 side. A central axis of the cylinder facing surface 151 extends in the vertical direction. As illustrated in FIGS. 3 to 5, the cylinder facing surface 151 has an inner diameter slightly larger than an outer diameter of the barrel part 21 of the cylinder 17. Distal end surfaces 152 and 153 are formed on both end sides of the cylinder facing surface 151 in a circumferential direction. The distal end surfaces 152 and 153 are disposed on the same plane extending parallel to the central axis of the cylinder facing surface 151. The cylinder facing surface 151 is made to coincide with the rod facing surface 141 illustrated in FIG. 2 in central axis.

A cylinder seal fitting recessed part 154 recessed outward in the radial direction of the cylinder facing surface 151 from an intermediate position of the cylinder facing surface 151 in the axial direction is formed on the opening 137 side of the cylinder facing flange part 134. As illustrated in FIG. 3, the cylinder seal fitting recessed part 154 is recessed outward in the radial direction of the cylinder facing surface 151 also from the cylinder facing surface 151 side of the distal end surfaces 152 and 153 in addition to the cylinder facing surface 151.

The cylinder seal fitting recessed part 154 includes an inner wall surface 156 on the distal end surface 152 side, an inner wall surface 157 on the distal end surface 153 side, and a back wall surface 158 connecting end edge portions of the inner wall surfaces 156 and 157 on a side opposite to the distal end surfaces 152 and 153. The inner wall surface 156 and the inner wall surface 157 are parallel to each other and face each other, and are perpendicular to the distal end surfaces 152 and 153. The inner wall surfaces 156 and 157 and the back wall surface 158 extend along the central axis of the cylinder facing surface 151.

As illustrated in FIG. 2, the rod seal 122 of the part case member 111 is fitted in the rod seal fitting recessed part 142 of the rod facing flange part 133. The rod seal 122 with it fitted in the rod seal fitting recessed part 142 includes a semicylindrical surface-shaped rod contact surface 161 having an inner diameter equal to or smaller than the outer diameter of the rod 51 on the opening 137 side thereof. The rod contact surface 161 of the rod seal 122 coincides with the rod facing surface 141 of the case member main body 121 in central axis. The rod contact surface 161 is positioned on an inner side of the rod facing surface 141 in the radial direction.

Therefore, the rod seal 122 includes an arc-shaped rod contact part 162 that protrudes inward in the radial direction with respect to the rod facing surface 141. Then, the rod contact surface 161 is formed at a protruding distal end of the rod contact part 162. In the part case member 111, the rod contact part 162 and a portion including the rod facing surface 141 of the rod facing flange part 133 on the rod facing surface 141 side constitute a rod facing part 165 that faces the rod 51 from the outside in the radial direction.

The cylinder seal 123 of the part case member 111 is fitted in the cylinder seal fitting recessed part 154 of the cylinder facing flange part 134. The cylinder seal 123 with it fitted in the cylinder seal fitting recessed part 154 includes a semicylindrical surface-shaped cylinder contact surface 171 having an inner diameter equal to or smaller than an outer diameter of the barrel part 21 on the opening 137 side. As illustrated in FIG. 3, the cylinder contact surface 171 of the cylinder seal 123 coincides with the cylinder facing surface 151 of the case member main body 121 in central axis. The cylinder contact surface 171 is positioned on an inner side of the cylinder facing surface 151 in the radial direction.

Therefore, the cylinder seal 123 includes an arc-shaped cylinder contact part 172 that protrudes inward in the radial direction with respect to the cylinder facing surface 151. The cylinder contact surface 171 is formed at a protruding distal end of the cylinder contact part 172.

Figure 6:
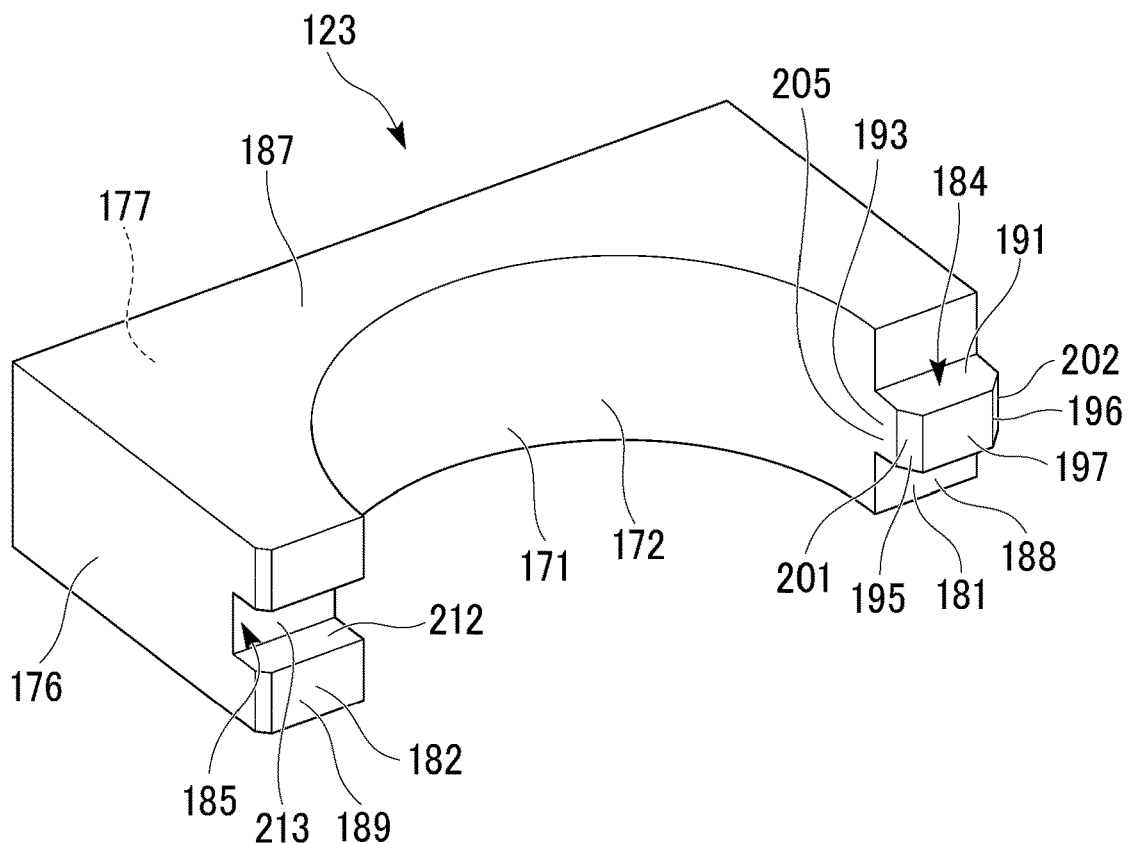
FIG. 6 is a perspective view illustrating a cylinder seal of the seal state detection device.

As illustrated in FIG. 6, the cylinder seal 123 includes an end portion contact surface 181 and an end portion contact surface 182 which are planar at both end portions of the cylinder contact surface 171 in the circumferential direction. The end portion contact surface 181 and the end portion contact surface 182 are disposed in the same plane. The end portion contact surface 181 and the end portion contact surface 182 are disposed on the same plane including the central axis of the cylinder contact surface 171. In other words, the end portion contact surface 181 and the end portion contact surface 182 extend perpendicular to a plane perpendicular to the central axis of the cylinder contact surface 171.

The cylinder seal 123 includes a protruding part 184 protruding from one end portion contact surface 181 in a direction perpendicular to the end portion contact surface 181, and a recessed part 185 recessed from the other end portion contact surface 182 in a direction perpendicular to the end portion contact surface 182. In other words, the cylinder seal 123 includes the protruding part 184 formed at one end portion of the cylinder contact surface 171 and the recessed part 185 formed at the other end portion thereof in the circumferential direction. Also, the protruding part 184 and the recessed part 185 are steps in a thickness direction of the cylinder seal 123, in other words, in the axial direction of the cylinder 17.

As illustrated in FIG. 3, in the cylinder seal 123, the end portion contact surface 181 and the protruding part 184 are disposed on the distal end surface 152 and the inner wall surface 156 side of the cylinder facing flange part 134. Also, the end portion contact surface 182 and the recessed part 185 are disposed on the distal end surface 153 and the inner wall surface 157 side. The end portion contact surface 181 is disposed on a side opposite to the back wall surface 158 with respect to the distal end surface 152. The end portion contact surface 182 is disposed on a side opposite to the back wall surface 158 with respect to the distal end surface 153. The cylinder seal 123 includes an end portion contact part 188 that protrudes toward a side opposite to the back wall surface 158 with respect to the distal end surface 152. The end portion contact part 188 includes the end portion contact surface 181. The cylinder seal 123 includes an end portion contact part 189 that protrudes toward a side opposite to the back wall surface 158 with respect to the distal end surface 153. The end portion contact part 189 includes the end portion contact surface 182.

As illustrated in FIG. 6, the protruding part 184 protrudes from the end portion contact surface 181 in a tangential direction at a position of the end portion contact surface 181 of the cylinder contact surface 171. The protruding part 184 is formed to extend throughout the end portion contact surface 181 in a radial direction of the cylinder contact surface 171.

The recessed part 185 is recessed from the end portion contact surface 182 in a tangential direction at a position of the end portion contact surface 182 of the cylinder contact surface 171. The recessed part 185 is formed to extend throughout the end portion contact surface 182 in the radial direction of the cylinder contact surface 171. An extending length of the protruding part 184 is equivalent to an extending length of the recessed part 185.

The cylinder seal 123 is constituted by a cylinder seal main body part 187 including the end portion contact surfaces 181 and 182, the recessed part 185, and the cylinder contact surface 171, and the protruding part 184 protruding from the end portion contact surface 181 of the cylinder seal main body part 187. The cylinder seal main body part 187 includes the end portion contact part 188 on the end portion contact surface 181 side including the end portion contact surface 181, the end portion contact part 189 on the end portion contact surface 182 side including the end portion contact surface 182, and the cylinder contact part 172 on the cylinder contact surface 171 side including the cylinder contact surface 171. The protruding part 184 protrudes from the end portion contact part 188.

As illustrated in FIG. 3, the cylinder seal main body part 187 includes a side surface 175 adjacent to a side of the end portion contact surface 181 opposite to the cylinder contact surface 171, a side surface 176 adjacent to a side of the end portion contact surface 182 opposite to the cylinder contact surface 171, and a back surface 177 connecting the side surfaces 175 and 176 at a position on a side opposite to the end portion contact surfaces 181 and 182. The side surfaces 175 and 176 extend perpendicular to the end portion contact surfaces 181 and 182. The back surface 177 extends parallel to the end portion contact surfaces 181 and 182. In the cylinder seal 123, the side surface 175 is in contact with the inner wall surface 156, the side surface 176 is in contact with the inner wall surface 157, and the back surface 177 is in contact with the back wall surface 158.

Figure 7:
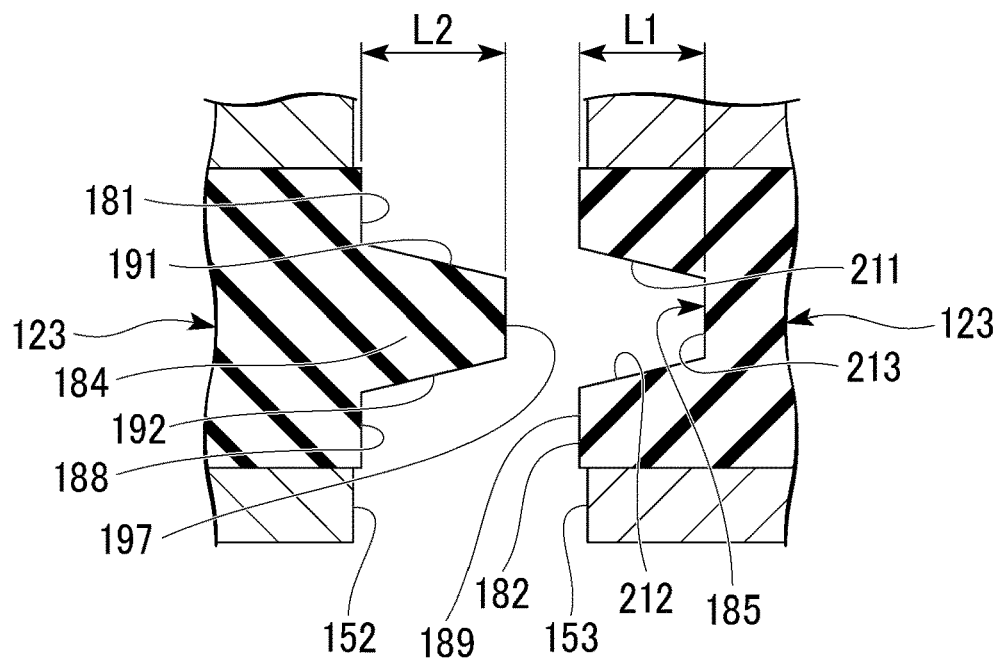
FIG. 7 is a view illustrating a periphery of a protruding part and a recessed part of a seal part of the seal state detection device and is a partial longitudinal sectional view along line C-C of FIG. 4.

The protruding part 184 includes an upper surface 191 illustrated in FIGS. 3, 6, and 7, a lower surface 192 illustrated in FIG. 7, an inner side surface 193 illustrated in FIGS. 3 and 6, an outer side surface 194 illustrated in FIG. 3, an inner chamfered surface 195 illustrated in FIGS. 3 and 6, an outer chamfered surface 196 illustrated in FIGS. 3 and 6, and a distal end surface 197 illustrated in FIGS. 3, 6, and 7. The upper surface 191, the lower surface 192, the inner side surface 193, the outer side surface 194, the inner chamfered surface 195, the outer chamfered surface 196, and the distal end surface 197 are all flat surfaces.

As illustrated in FIG. 6, the upper surface 191 is at an upper portion of the protruding part 184 and faces upward. A boundary edge portion of the upper surface 191 with the end portion contact surface 181 is disposed in a plane perpendicular to the central line of the cylinder contact surface 171. As illustrated in FIG. 7, the lower surface 192 is positioned at a lower portion of the protruding part 184 and faces downward. A boundary edge portion of the lower surface 192 with the end portion contact surface 181 is disposed in a plane perpendicular to the central line of the cylinder contact surface 171.

The upper surface 191 and the lower surface 192 each extend from an end edge portion on the end portion contact surface 181 side in a direction away from the end portion contact surface 181 and are inclined to be closer to each other with distance away from the end portion contact surface 181. The upper surface 191 and the lower surface 192 are at the same angle with respect to the end portion contact surface 181. In other words, the upper surface 191 and the lower surface 192 each have an obtuse angle with respect to the end portion contact surface 181.

The distal end surface 197 is at a distal end portion of the protruding part 184 on a side opposite to the end portion contact surface 181 and faces in the same direction as the end portion contact surface 181. The distal end surface 197 connects end edge portions of the upper surface 191 and the lower surface 192 on a side opposite to the end portion contact surface 181. The distal end surface 197 extends parallel to the end portion contact surface 181. A boundary edge portion of the distal end surface 197 with the upper surface 191 and a boundary edge portion thereof with the lower surface 192 are both disposed in a plane perpendicular to the central line of the cylinder contact surface 171.

As illustrated in FIG. 6, the inner side surface 193 is on the central axis side of the cylinder contact surface 171 in the protruding part 184 and faces in a central axis direction. The inner side surface 193 extends parallel to the central axis of the cylinder contact surface 171 and extends in a tangential direction at a position of the end portion contact surface 181 of the cylinder contact surface 171. The inner side surface 193 is continuous with the cylinder contact surface 171. The inner side surface 193 extends perpendicular to the distal end surface 197.

As illustrated in FIG. 3, the outer side surface 194 is on a side of the protruding part 184 opposite to the cylinder contact surface 171, and faces a direction opposite to the central axis of the cylinder contact surface 171. The outer side surface 194 is parallel to the central axis of the cylinder contact surface 171 and extends parallel to the inner side surface 193. The outer side surface 194 is continuous with the side surface 175 of the cylinder seal main body part 187 and disposed on the same plane. The outer side surface 194 extends perpendicular to the distal end surface 197.

The inner chamfered surface 195 connects an end edge portion of the inner side surface 193 on a side opposite to the end portion contact surface 181 and an end edge portion of the distal end surface 197 on the cylinder contact surface 171 side. The inner chamfered surface 195 extends parallel to the central axis of the cylinder contact surface 171. The inner chamfered surface 195 is inclined at the same angle with respect to the inner side surface 193 and the distal end surface 197.

The outer chamfered surface 196 connects an end edge portion of the outer side surface 194 on a side opposite to the end portion contact surface 181 and an end edge portion of the distal end surface 197 on a side opposite to the cylinder contact surface 171. The outer chamfered surface 196 extends parallel to the central axis of the cylinder contact surface 171. The outer chamfered surface 196 is inclined at the same angle with respect to the outer side surface 194 and the distal end surface 197. An angle formed by the outer chamfered surface 196 and the distal end surface 197 is equivalent to an angle formed by the inner chamfered surface 195 and the distal end surface 197.

The protruding part 184 includes a chamfered portion 201 on the inner chamfered surface 195 side including the inner chamfered surface 195 and a chamfered portion 202 on the outer chamfered surface 196 side including the outer chamfered surface 196 at both ends in the radial direction of the cylinder contact surface 171. Also, the protruding part 184 includes a flat portion 205 on the inner side surface 193 side including the inner side surface 193 and a flat portion 206 on the outer side surface 194 side including the outer side surface 194 at both ends in the radial direction of the cylinder contact surface 171.

As illustrated in FIG. 7, the recessed part 185 includes an upper inner surface 211, a lower inner surface 212, and a bottom surface 213. The upper inner surface 211, the lower inner surface 212, and the bottom surface 213 are all flat surfaces.

The upper inner surface 211 is at an upper portion of the recessed part 185 and faces downward. A boundary edge portion of the upper inner surface 211 with the end portion contact surface 182 is disposed in a plane perpendicular to the central line of the cylinder contact surface 171. The lower inner surface 212 is at a lower portion of the recessed part 185 and faces upward. A boundary edge portion of the lower inner surface 212 with the end portion contact surface 182 is disposed in a plane perpendicular to the central line of the cylinder contact surface 171. The upper inner surface 211 and the lower inner surface 212 each extend from an end edge portion on the end portion contact surface 182 side in a direction away from the end portion contact surface 182 and are inclined to be closer to each other with distance away from the end portion contact surface 182. The upper inner surface 211 and the lower inner surface 212 are at the same angle with respect to the end portion contact surface 182.

The bottom surface 213 is on a side of the recessed part 185 opposite to the end portion contact surface 182 and faces the same direction as the end portion contact surface 182. The bottom surface 213 connects end edge portions of the upper inner surface 211 and the lower inner surface 212 on a side opposite to the end portion contact surface 182. A boundary edge portion of the bottom surface 213 with the upper inner surface 211 and a boundary edge portion thereof with the lower inner surface 212 are both disposed in a plane perpendicular to the central line of the cylinder contact surface 171. The bottom surface 213 extends parallel to the end portion contact surface 182. An angle formed by the bottom surface 213 and the upper inner surface 211 is an obtuse angle, and an angle formed by the bottom surface 213 and the lower inner surface 212 is also an obtuse angle. The upper inner surface 211 and the lower inner surface 212 are at the same angle with respect to the bottom surface 213.

An angle formed by the upper surface 191 and a portion of the end portion contact surface 181 connected to the upper surface 191, an angle formed by the upper surface 191 and the distal end surface 197, an angle formed by the lower surface 192 and a portion of the end portion contact surface 181 connected to the lower surface 192, an angle formed by the lower surface 192 and the distal end surface 197, an angle formed by the upper inner surface 211 and a portion of the end portion contact surface 182 connected to the upper inner surface 211, an angle formed by the upper inner surface 211 and the bottom surface 213, an angle formed by the lower inner surface 212 and a portion of the end portion contact surface 182 connected to the lower inner surface 212, and an angle formed by the lower inner surface 212 and the bottom surface 213 are the same.

A distance L1 between the end portion contact surface 182 and the bottom surface 213 is smaller than a distance L2 between the end portion contact surface 181 and the distal end surface 197. In other words, a protrusion dimension L2 of the protruding part 184 is larger than a depth dimension L1 of the recessed part 185. A length of the distal end surface 197 is equivalent to a length of the bottom surface 213 in the central axis direction of the cylinder contact surface 171.

As illustrated in FIG. 3, in the part case member 111, the cylinder contact part 172, a portion of the cylinder facing flange part 134 on the cylinder facing surface 151 side including the cylinder facing surface 151, the end portion contact part 188, the end portion contact part 189, the protruding part 184, and the recessed part 185 constitute a cylinder facing part 220 facing the barrel part 21 of the cylinder 17 from the outside in the radial direction. The cylinder contact part 172, the end portion contact part 188, the end portion contact part 189, the protruding part 184, and the recessed part 185 which are formed of the cylinder seal 123 in the cylinder facing part 220 constitute a seal part 221 that comes into contact with the barrel part 21 of the cylinder 17 from the outside in the radial direction. In other words, the part case member 111 includes the seal part 221 that comes into contact with the barrel part 21 of the cylinder 17 in the cylinder facing part 220.

Although not illustrated, on the opening 137 side of the case member main body 121 of the part case member 111 illustrated in FIG. 2, a seal groove is formed to be recessed from a distal end surface on the opening 137 side thereof to form a continuous rectangular annular shape with the rod seal fitting recessed part 142 and the cylinder seal fitting recessed part 154 in the pair of side wall parts 131, a portion of the rod facing flange part 133 other than the rod seal fitting recessed part 142, and a portion of the cylinder facing flange part 134 other than the cylinder seal fitting recessed part 154. A case seal is also fitted in this seal groove to form a continuous rectangular annular shape with the rod seal 122 and the cylinder seal 123. The case seal slightly protrudes from the distal end surface of the case member main body 121 on the opening 137 side.

The part case member 112 also has the same configuration as the part case member 111, and includes the case member main body 121, the rod seal 122, the cylinder seal 123, and the case seal (not illustrated). The part case member 112 is one in which the part case member 111 is reversed by 180° in a horizontal plane. Therefore, a plurality of part case members 111 and 112 each have the seal part 221 having the same shape as each other.

Although not illustrated, the seal state detection device 101 includes a setting part, a first drive unit, and a second drive unit. The cylinder device 11 is vertically fixed to the setting part with the mounting eye 71 on an upper side. The first drive unit brings the part case member 111 disposed on one side in the radial direction closer to and away from the cylinder device 11, that has been set to the setting part, in the radial direction of the cylinder device 11. The second drive unit brings the part case member 112 disposed on the opposite side in the radial direction closer to and away from the cylinder device 11, that has been set to the setting part, in the radial direction of the cylinder device 11.

In a reference plane including the central axis of the barrel part 21 of the cylinder device 11 set to the setting part, the first drive unit moves the part case member 111 to move the central axis of the cylinder contact surface 171 in parallel with the central axis of the barrel part 21. The second drive unit also moves the part case member 112 to move the central axis of the cylinder contact surface 171 in parallel with the central axis of the barrel part 21 in the reference plane on a side opposite to the part case member 111 with respect to the cylinder device 11 set to the setting part. The first drive unit and the second drive unit move the part case members 111 and 112 to be aligned in height position. The first drive unit and the second drive unit move the part case members 111 and 112 with the protruding part 184 of the part case member 111 and the recessed part 185 of the part case member 112 facing to be fittable, and the recessed part 185 of the part case member 111 and the protruding part 184 of the part case member 112 facing to be fittable.

When driven by the first drive unit and the second drive unit, the part case member 111 and the part case member 112 each cause the cylinder facing part 220 to face the barrel part 21 of the outer tube 16 of the cylinder 17 from the outside in the radial direction and cause the rod facing part 165 to face the rod 51 from the outside in the radial direction so that they are aligned in the circumferential direction of the cylinder 17 to form an annular shape as a whole.

Then, the part case member 111 and the part case member 112 each bring the cylinder contact part 172 into contact with the barrel part 21 from the outside in the radial direction to be in close contact with each other and bring the rod contact part 162 into contact with the rod 51 from the outside in the radial direction to be in close contact with each other.

At that time, the part case member 111 and the part case member 112 are brought into close contact with each other while the protruding part 184 of the part case member 111 and the recessed part 185 of the part case member 112 facing in the circumferential direction of the cylinder 17 are fitted and elastically deformed as illustrated in FIGS. 3 to 5. In addition, the part case member 111 and the part case member 112 are brought into close contact with each other while the recessed part 185 of the part case member 111 and the protruding part 184 of the part case member 112 are fitted and elastically deformed. In the protruding part 184 and the recessed part 185 to be fitted, the upper surface 191 and the upper inner surface 211 illustrated in FIG. 7 come into close contact with each other without a gap, the lower surface 192 and the lower inner surface 212 come into close contact with each other without a gap, and the distal end surface 197 and the bottom surface 213 come into close contact with each other without a gap. In other words, when the part case member 111 and the part case member 112 are disposed to be aligned in the circumferential direction of the cylinder 17, the protruding part 184 and the recessed part 185 facing each other in the circumferential direction of the cylinder 17 are fitted to each other.

Also, at that time, the part case member 111 and the part case member 112 bring the end portion contact part 188 of the part case member 111 and the end portion contact part 189 of the part case member 112 illustrated in FIG. 3 into contact with each other to be in close contact without a gap. In addition, the end portion contact part 189 of the part case member 111 and the end portion contact part 188 of the part case member 112 are brought into contact with each other to be in close contact without a gap.

That is, the part case member 111 and the part case member 112 bring the seal parts 221 into close contact with each other and bring the seal parts 221 into close contact with the barrel part 21 of the cylinder 17. In this way, the part case member 111 and the part case member 112 are brought into close contact with the barrel part 21 of the cylinder 17 by the seal parts 221 of the cylinder seals 123 without a gap over the entire circumference. Also, at that time, the part case member 111 and the part case member 112 are brought into close contact with the rod 51 by the rod seals 122 illustrated in FIG. 2 without a gap over the entire circumference.

Here, as illustrated in FIG. 3, a distance between the inner side surfaces 193 of the protruding part 184 of the part case member 111 and the protruding part 184 of the part case member 112 is smaller than an outer diameter of the barrel part 21 by an amount corresponding to a tightening allowance. Also, the inner chamfered surface 195 of the protruding part 184 forms an angle close to an angle formed by a tangential direction at a contact start position of the barrel part 21. Also, as illustrated in FIG. 3, the outer side surface 194 of the protruding part 184 is disposed on the same plane as the inner wall surface 157 of the case member main body 121 adjacent to the recessed part 185 to which the protruding part 184 is to be fitted.

As described above, the part case members 111 and 112 constituting the chamber 102 form a housing chamber 231 for housing a part of the cylinder 17 on the opening 23 side and a part of the rod 51 on the cylinder 17 side between the cylinder facing part 220 and the rod facing part 165 as illustrated in FIG. 2.

The detection device main body part 103 includes a decompression unit 241 that brings the inside of the housing chamber 231 in a sealed state into a decompressed state by evacuating it for a predetermined evacuation time. The decompression unit 241 includes a vacuum pump 242 formed of a rotary pump, a communication passage 243 connecting the vacuum pump 242 and the inside of the housing chamber 231 to allow communication therebetween, and an on-off valve 244 provided in the communication passage 243 and configured to switch communication and shutoff between the vacuum pump 242 and the inside of the housing chamber 231 by opening and closing.

The vacuum pump 242 evacuates the inside of the housing chamber 231 in a sealed state with the on-off valve 244 open. When the on-off valve 244 is closed, communication between the inside of the housing chamber 231 and the vacuum pump 242 is cut off, and the inside of the housing chamber 231 is maintained in the above-described decompressed state. The vacuum pump 242 is not limited to a rotary pump, and a mechanical booster pump or a diffusion pump may also be used.

The detection device main body part 103 includes an atmosphere introduction part 251 that introduces the atmosphere into the housing chamber 231. The atmosphere introduction part 251 is connected to the communication passage 243 between the housing chamber 231 and the on-off valve 244, and includes an atmosphere opening passage 252 that opens the inside of the housing chamber 231 to the outside air through the communication passage 243, and an atmosphere opening valve 253 provided in the atmosphere opening passage 252 and configured to switch between opening the housing chamber 231 to the outside air and shutting it off from the outside air by opening and closing. The atmosphere opening valve 253 allows the inside of the housing chamber 231 to communicate with the outside air when it is opened, and shuts off the inside of the housing chamber 231 from the outside air when it is closed.

The detection device main body part 103 includes a vacuum gauge 255 formed of a Pirani vacuum gauge that measures a pressure in the housing chamber 231 via the communication passage 243, and a data logger 256 that stores detection data of the vacuum gauge 255. The detection device main body part 103 includes a control unit 258. The control unit 258 controls operations of the vacuum pump 242, the on-off valve 244, and the atmosphere opening valve 253, and detects an abnormality in the seal state of the seal member 31 in the cylinder device 11 on the basis of a measurement result of the pressure in the housing chamber 231 decompressed by the decompression unit 241 by the vacuum gauge 255.

When the seal state of the seal member 31 is detected using the seal state detection device 101, an operator performs a setting step of setting, positioning, and fixing the cylinder device 11 to be measured to the setting part (not illustrated) of the seal state detection device 101 by, for example, a manual operation. In the setting step, the operator sets the cylinder device 11 to the setting part so that the seal member 31 is directed to be positioned at an upper portion in the cylinder 17.

After the setting step, a start button (not illustrated) of the seal state detection device 101 is operated. Then, the control unit 258 performs a first disposition step in which a first drive unit (not illustrated) is driven to move the part case member 111 forward to the barrel part 21 side of the cylinder 17 and stop it at a predetermined position as illustrated in FIGS. 3 to 4. Then, in the middle thereof, the protruding part 184 of the part case member 111 first comes into contact with the barrel part 21 at the chamfered portion 201, and then comes into close contact with the barrel part 21 while elastically deforming the flat portion 205, and the cylinder contact part 172 comes into close contact with the barrel part 21 while being elastically deformed as illustrated in FIG. 4.

Next, the control unit 258 performs a second disposition step in which a second drive unit (not illustrated) is driven to move the part case member 112 forward to the barrel part 21 side of the cylinder 17 and stop it at a predetermined position as illustrated in FIGS. 4 to 5. Then, in the middle thereof, the protruding part 184 of the part case member 112 first comes into contact with the barrel part 21 at the chamfered portion 201, then comes into contact with a boundary position between the distal end surface 153 and the inner wall surface 157 of the part case member 111 at the chamfered portion 202 while elastically deforming the flat portion 205, and then fits into the recessed part 185 of the part case member 111. Then, as illustrated in FIG. 5, in the part case member 112, the flat portion 205 of the protruding part 184 thereof comes into close contact with the barrel part 21 while being elastically deformed, the flat portion 206 of the protruding part 184 thereof comes into close contact with the inner wall surface 157 of the part case member 111 while being elastically deformed, and the cylinder contact part 172 thereof comes into close contact with the barrel part 21 while being elastically deformed.

In parallel with this, as illustrated in FIG. 4 to 5, the protruding part 184 of the part case member 111 comes into contact with the boundary position between the distal end surface 153 and the inner wall surface 157 of the part case member 112 at the chamfered portion 202, and then fits into the recessed part 185 of the part case member 112. Then, as illustrated in FIG. 5, the flat portion 206 of the part case member 111 comes into close contact with the inner wall surface 157 of the part case member 112 while being elastically deformed.

In addition to these, the end portion contact part 188 of the part case member 111 comes into close contact with the end portion contact part 189 of the part case member 112, and the end portion contact part 189 of the part case member 111 comes into close contact with the end portion contact part 188 of the part case member 112. Further, the case seals (not illustrated) of the part case members 111 and 112 come into close contact with each other.

In this state, in the protruding parts 184 and the recessed parts 185 on both sides to be fitted, the upper surface 191 and the upper inner surface 211 illustrated in FIG. 7 are in close contact with each other without a gap, the lower surface 192 and the lower inner surface 212 are in close contact with each other without a gap, the distal end surface 197 and the bottom surface 213 are in close contact with each other without a gap.

As illustrated in FIG. 2, the part case members 111 and 112 of the chamber 102 form the housing chamber 231 that houses a part of the cylinder 17 on the opening 23 side and a part of the rod 51 on the cylinder 17 side between the cylinder facing part 220 and the rod facing part 165 by the above first disposition step and the second disposition step. The housing chamber 231 other than the communication passage 243 is sealed. That is, the first disposition step and the second disposition step serve as a housing chamber forming step of forming the housing chamber 231 for housing a part of the cylinder 17 and a part of the rod 51 between the cylinder facing part 220 and the rod facing part 165 by disposing the plurality of part case members 111 and 112 to be aligned in the circumferential direction of the cylinder 17.

After the second disposition step, the control unit 258 performs a decompression step of bringing the inside of the housing chamber 231 into a decompressed state by evacuating it for a predetermined evacuation time using the decompression unit 241 with the atmosphere opening valve 253 of the atmosphere introduction part 251 closed. That is, the control unit 258 drives the vacuum pump 242 for a predetermined evacuation time with the on-off valve 244 of the decompression unit 241 open to reduce a pressure of the inside of the housing chamber 231 which has been at atmospheric pressure until then.

When the control unit 258 drives the vacuum pump 242 for a predetermined evacuation time, the on-off valve 244 is closed and the vacuum pump 242 is stopped. Thereby, it becomes a decompressed state in which the pressure in the housing chamber 231 is reduced.

After the decompression step, the control unit 258 performs a first pressure measurement step of measuring the pressure in the housing chamber 231 with the vacuum gauge 255 after a stabilization step of waiting for a lapse of a predetermined stabilization time. In this first pressure measurement step, a first pressure value in the housing chamber 231 is measured by the vacuum gauge 255 at a first time point after waiting for the lapse of a predetermined stabilization time by the stabilization step. For example, the stabilization step is started from the time of an end of the decompression step, and the first pressure measurement step of measuring the first pressure value in the housing chamber 231 with the vacuum gauge 255 is performed at the first time point when the stabilization step is ended.

After the first pressure measurement step, the control unit 258 performs a first pressure abnormality detection step (abnormality detection step) of detecting presence or absence of an abnormality in the seal state of the seal member 31 on the basis of the pressure in the housing chamber 231 that has been brought into the decompressed state in the decompression step. In this first pressure abnormality detection step, the presence or absence of abnormality in the seal state of the seal member 31 is detected on the basis of the first pressure value measured in the first pressure measurement step. Specifically, when the first pressure value is equal to or higher than a predetermined threshold value, the control unit 258 detects that there is an evacuation abnormality in which the seal member 31 has a seal state abnormality and evacuation itself cannot be performed normally, and when the first pressure value is less than the predetermined threshold value, the control unit 258 performs a second pressure measurement step to be described later.

That is, when there is a significant abnormality in the seal state of the seal member 31, a predetermined amount or more of the gas G in the cylinder device 11 is suctioned into the housing chamber 231 in a negative pressure state during the decompression step, and it becomes a state in which the pressure in the housing chamber 231 is not sufficiently reduced. As a result, it becomes an evacuation abnormal state in which the first pressure value at the first time point increases to be equal to or higher than the threshold value. On the other hand, when there is no abnormality in the seal state of the seal member 31, or when there is a minor abnormality, a predetermined amount or more of the gas G in the cylinder device 11 is not suctioned into the housing chamber 231 during the decompression step, the first pressure value at the first time point decreases, and it becomes an evacuation normal state in which the first pressure value at the first time point is less than the predetermined threshold value. As a first step, the control unit 258 first detects the presence or absence of an abnormality in the seal state of the seal member 31 by a difference between the evacuation abnormal state and the evacuation normal state.

When the first pressure value is less than the predetermined threshold value in the first pressure abnormality detection step, the control unit 258 performs a second pressure measurement step of measuring a second pressure value in the housing chamber 231 at a second time point after a predetermined inspection time has elapsed since the first time point.

After the second pressure measurement step, the control unit 258 performs a second pressure abnormality detection step (abnormality detection step) of detecting the presence or absence of an abnormality in the seal state of the seal member 31 on the basis of the pressure in the housing chamber 231. In this second pressure abnormality detection step, the presence or absence of an abnormality in the seal state of the seal member 31 is detected on the basis of a pressure difference between the first pressure value and the second pressure value. Specifically, when a value obtained by dividing the pressure difference, which is obtained by subtracting the first pressure value from the second pressure value, by a predetermined inspection time from the first time point to the second time point, that is, when a pressure rise rate per unit time in the inspection time from the first time point to the second time point is equal to or higher than a predetermined threshold value, the control unit 258 detects that there is an abnormality in the seal state of the seal member 31, and when it is less than the threshold value, the control unit 258 detects that there is no abnormality in the seal state of the seal member 31.

That is, when there is an abnormality in the seal state of the seal member 31, a predetermined amount or more of the gas G in the cylinder device 11 is suctioned into the housing chamber 231 in a negative pressure state during the predetermined inspection time. In that case, the pressure in the housing chamber 231 rises with the elapse of time, and it becomes a differential pressure abnormal state in which a value obtained by dividing the pressure difference, which is obtained by subtracting the first pressure value from the second pressure value, by the predetermined inspection time is the threshold value or higher.

Conversely, when there is no abnormality in the seal state of the seal member 31, a predetermined amount or more of the gas G in the cylinder device 11 is not suctioned into the housing chamber 231 in a negative pressure state during the predetermined inspection time. In that case, the pressure rise in the housing chamber 231 is suppressed, and it becomes a differential pressure normal state in which the value obtained by dividing the pressure difference, which is obtained by subtracting the first pressure value from the second pressure value, by the predetermined inspection time does not become equal to or higher than the threshold value. As a second step, the control unit 258 detects presence or absence of an abnormality in the seal state of the seal member 31 by a difference between the differential pressure abnormal state and the differential pressure normal state.

As described above, the seal state detection method of the present embodiment includes the housing chamber forming step of forming the housing chamber 231 for housing a part of the cylinder 17 and a part of the rod 51 between the cylinder facing part 220 and the rod facing part 165 by disposing the part case members 111 and 112 to be aligned in the circumferential direction of the cylinder 17, and a seal state detection step of detecting an abnormality in the seal state of the seal member 31 from the state inside the housing chamber 231. Then, the seal state detection step includes a decompression step of bringing the inside of housing chamber 231 into a decompressed state in which a pressure thereof is reduced by a predetermined pressure from atmospheric pressure, the first and second pressure measurement steps of measuring the pressure in the housing chamber 231 that has been brought into the decompressed state in the decompression step, and the first and second pressure abnormality detection steps of detecting an abnormality on the basis of the pressure in the housing chamber 231.

In the second pressure abnormality detection step, when it is detected that there is no abnormality in the seal state of the seal member 31, the control unit 258 performs an atmosphere opening step of opening the atmosphere opening valve 253 of the atmosphere introduction part 251 to open the inside of the housing chamber 231 to the atmosphere.

In the second pressure abnormality detection step, when it is detected that there is no abnormality in the seal state of the seal member 31, after the atmosphere opening step, the control unit 258 performs a separation step of separating the part case members 111 and 112 from the barrel part 21 of the cylinder 17 using the first drive unit and the second drive unit.

In the second pressure abnormality detection step, when it is detected that there is no abnormality in the seal state of the seal member 31, after the separation step, the control unit 258 uses a notification device (not illustrated) to perform a normal notification step of notifying that the seal member 31 is non-defective article having no abnormality in the seal state and notifying an indication to urge the cylinder device 11 to be taken out from the seal state detection device 101.

Then, the operator performs a taking-out step of taking out the cylinder device 11 from the seal state detection device 101 by, for example, a manual operation.

Here, in any of a case in which there is an abnormality in the seal state of the seal member 31 in the first pressure abnormality detection step, that is, it is determined to be an evacuation abnormal state in which evacuation itself cannot be performed normally, and a case in which there is an abnormality in the seal state of the seal member 31 in the second pressure abnormality detection step, that is, it is determined to be a differential pressure abnormal state in which the pressure rise rate per unit time is abnormal, the control unit 258 performs a re-inspection flow for the above-described atmosphere opening step, decompression step, stabilization step, first pressure measurement step, first pressure abnormality detection step, second pressure measurement step, and second pressure abnormality detection step.

In the re-inspection flow, in both the case in which an abnormality in the seal state of the seal member 31 is detected in the first pressure abnormality detection step and the case in which an abnormality in the seal state of the seal member 31 is detected in the second pressure abnormality detection step, the control unit 258 performs the atmosphere opening step and the separation step. Thereafter, the control unit 258 uses a notification device (not illustrated) to perform an abnormality notification step for notifying that there has been an abnormality in the seal state of the seal member 31 and notifying an indication to urge the cylinder device 11 to be taken out from the seal state detection device 101. At that time, the notification is performed including whether the abnormality in the seal state of the seal member 31 is detected in the first pressure abnormality detection step or the second pressure abnormality detection step.

Then, the operator performs a taking-out step of taking out the cylinder device 11 from the seal state detection device 101 by, for example, a manual operation.

In the seal abnormality detection method and device of the damper device of Patent Document 1 described above, the vacuum head is configured to be lowered by driving of the head upper and lower cylinders and mounted around the piston rod of the damper device. Incidentally, in a device having such a structure, when a component protruding radially outward from the piston rod is attached to the piston rod, the component causes interference and the vacuum head cannot be mounted on the damper device. Therefore, a degree of freedom in timing of inspection is reduced.

In contrast, the seal state detection device 101 of the present embodiment includes a plurality of part case members 111 and 112 having the cylinder facing part 220 and the rod facing part 165 and disposed to be aligned in the circumferential direction of the cylinder 17 by causing the cylinder facing part 220 to face the cylinder 17 and the rod facing part 165 to face the rod 51 so that the housing chamber 231 for housing a part of the cylinder 17 and a part of the rod 51 is formed between the cylinder facing part 220 and the rod facing part 165. Therefore, the housing chamber 231 can be formed regardless of whether or not the mounting eye 71 protruding radially outward from the rod 51 is attached to the rod 51. Accordingly, a degree of freedom in timing of inspecting a seal abnormality can be increased.

Also, the part case members 111 and 112 each include the seal part 221 that comes into contact with the cylinder 17 at the cylinder facing part 220. The seal part 221 includes the protruding part 184 formed at one end thereof and the recessed part 185 formed at the other end thereof in the circumferential direction of the cylinder 17. Then, when the part case members 111 and 112 are disposed to be aligned in the circumferential direction of the cylinder 17, the protruding part 184 and the recessed part 185 facing in the circumferential direction of the cylinder 17 are fitted to each other. Therefore, decrease in durability of the seal part 221 can be suppressed.

That is, when the seal parts 221 are brought into contact with each other, if the flat end portion contact parts 188 and 189 are only brought into contact with each other, the end portion contact parts 188 and 189 each contract toward an intermediate portion of the cylinder 17 in the axial direction, stress concentration occurs in the intermediate portion of the cylinder 17 in the axial direction, and thereby the cylinder 17 is likely to be broken. In contrast, when the protruding part 184 and the recessed part 185 in the middle of the cylinder 17 in the axial direction are fitted to each other when the end portion contact part 188 and the end portion contact part 189 are brought into contact with each other, the contraction toward the intermediate portion in the axial direction can be reduced. Therefore, stress concentration occurred at a portion in the vicinity of the end portion contact part 188 and a portion in the vicinity of the end portion contact part 189 can be suppressed and occurrence of breakage can be suppressed. Therefore, decrease in durability of the seal part 221 can be suppressed.

Also, since the protrusion dimension L2 of the protruding part 184 is larger than the depth dimension L1 of the recessed part 185, the distal end surface 197 of the protruding part 184 and the bottom surface 213 of the recessed part 185 can be reliably brought into close contact with each other. Therefore, a sealing property at the fitting portion between the protruding part 184 and the recessed part 185 can be improved.

Also, since the chamfered portions 201 and 202 are provided at both ends of the protruding part 184, the protruding part 184 being entangled with the cylinder 17 and being entangled with the cylinder seal fitting recessed part 154 can be suppressed. Therefore, decrease in sealing property and decrease in durability of the seal part 221 can be suppressed.

Also, since the flat portions 205 and 206 are provided at both ends of the protruding part 184, the protruding part 184 being entangled with the cylinder 17 and being entangled with the cylinder seal fitting recessed part 154 can be suppressed. Therefore, decrease in sealing property and decrease in durability of the seal part 221 can be suppressed.

Also, since the seal parts 221 of the plurality of part case members 111 and 112 have the same shape as each other, the cylinder seal 123 constituting the seal part 221 can be used as a common part. Therefore, types of parts can be reduced, and manufacturing costs and management costs can be reduced.

The seal state detection method of the present embodiment is a method of detecting a seal state of the seal member 31 of the cylinder device 11 using the seal state detection device 101. The seal state detection method includes the housing chamber forming step of forming the housing chamber 231 for housing a part of the cylinder 17 and a part of the rod 51 between the cylinder facing part 220 and the rod facing part 165 by disposing the plurality of part case members 111 and 112 to be aligned in the circumferential direction of the cylinder 17, the decompression step of bringing the inside of the housing chamber 231 into a decompressed state in which a pressure thereof is reduced by a predetermined pressure from atmospheric pressure, and the abnormality detection step of detecting an abnormality on the basis of the pressure in the housing chamber 231 that has been brought into the decompressed state in the decompression step. Therefore, the housing chamber 231 can be formed regardless of whether or not the mounting eye 71 protruding radially outward from the rod 51 is attached to the rod 51. Accordingly, a degree of freedom in timing of inspecting a seal abnormality can be increased.

The above-described embodiment can be changed as described in the following modified examples 1 to 3.

MODIFIED EXAMPLE 1

Figure 8:
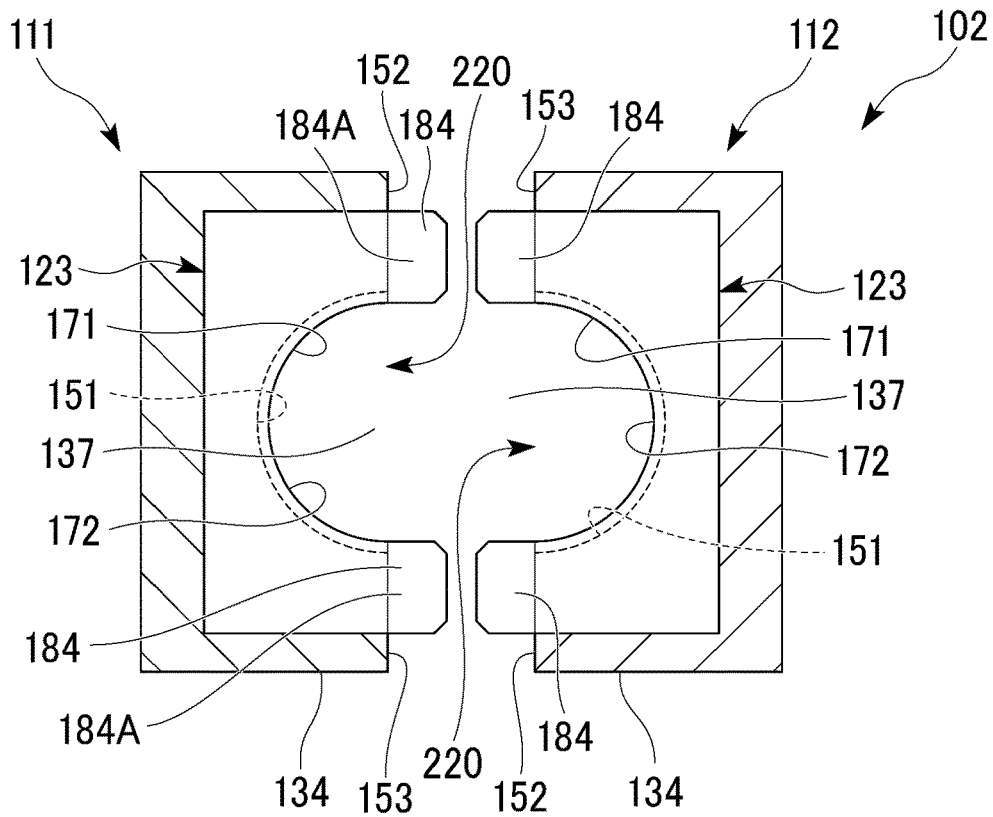
FIG. 8 is a view illustrating modified example 1 of the seal state detection device and is a plan sectional view corresponding to FIG. 3.
Figure 9:
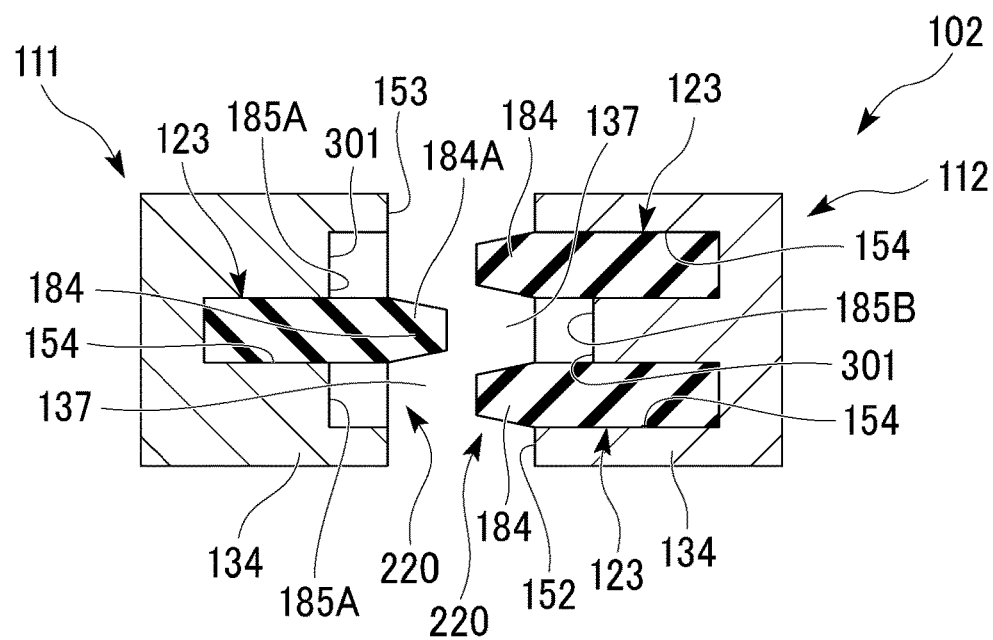
FIG. 9 is a view illustrating modified example 1 and is a partial longitudinal sectional view corresponding to FIG. 7.
Figure 10:
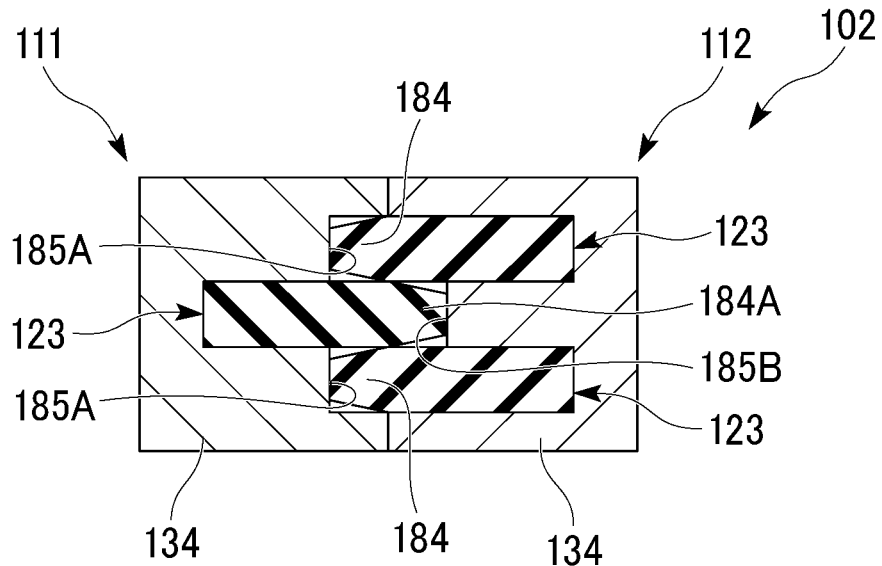
FIG. 10 is a view illustrating modified example 1 and is a partial longitudinal sectional view corresponding to FIG. 9.

In modified example 1 illustrated in FIGS. 8 to 10, an inlet recessed part 301 recessed from an intermediate position of the cylinder facing surface 151 in the axial direction on each of the distal end surfaces 152 and 153 is formed in the part case members 111 and 112 as illustrated in FIG. 9.

The part case member 111 of modified example 1 includes one cylinder seal fitting recessed part 154, that is recessed from an intermediate position of the cylinder facing surface 151 in the axial direction, formed in the inlet recessed part 301. The part case member 112 of modified example 1 includes two cylinder seal fitting recessed parts 154, that are recessed from intermediate positions of the cylinder facing surface 151 in the axial direction, formed in the inlet recessed part 301. The two cylinder seal fitting recessed parts 154 of the part case member 112 are disposed on both sides of the one cylinder seal fitting recessed part 154 of the part case member 111 in the axial direction of the cylinder facing surface 151.

In modified example 1, the cylinder seal 123 having the protruding part 184 formed on both sides of the cylinder contact surface 171 in the circumferential direction and whose entire thickness is the same as a maximum thickness of the protruding part 184 is fitted into the two cylinder seal fitting recessed part 154 of the part case member 112 and the one cylinder seal fitting recessed part 154 of the part case member 111.

In modified example 1, in the seal part 221 of the part case member 111, a portion on a side of the protruding part 184 protruding from a bottom surface of the inlet recessed part 301 of the cylinder seal 123 is a protruding part 184A, and a portion between the inlet recessed part 301 and the protruding part 184A is a recessed part 185A. Therefore, there are two recessed parts 185A. As a result, the seal part 221 of the part case member 111 includes one protruding part 184A and two recessed parts 185A formed at one end, and two recessed parts 185A and one protruding part 184A formed at the other end.

Also, in the seal part 221 of the part case member 112 in modified example 1, a portion between portions of the protruding parts 184 sides of the two cylinder seals 123 is a recessed part 185B, and there are two protruding parts 184. As a result, the seal part 221 of the part case member 112 includes two protruding parts 184 and one recessed part 185B formed at one end, and one recessed part 185B and two protruding parts 184 formed at the other end.

Then, in modified example 1, as illustrated in FIGS. 9 to 10, in the part case member 111, the protruding part 184A at one end is fitted into the recessed part 185B of the part case member 112 facing the recessed part 184A, and the two recessed parts 185A at one end are fitted onto the two protruding parts 184 of the part case member 112 facing the recessed parts 185A. Also, in the part case member 111, the two recessed parts 185A at the other end are fitted onto the two protruding parts 184 of the part case member 112 facing the recessed parts 185A, and the protruding part 184A at the other end is fitted into the recessed part 185B of the part case member 112 facing the recessed part 184A. In addition, the part case members 111 and 112 bring the cylinder contact parts 172 into contact with the barrel part 21. Thereby, the chamber 102 comes into close contact with the barrel part 21 without a gap over the entire circumference.

MODIFIED EXAMPLE 2

Figure 11:
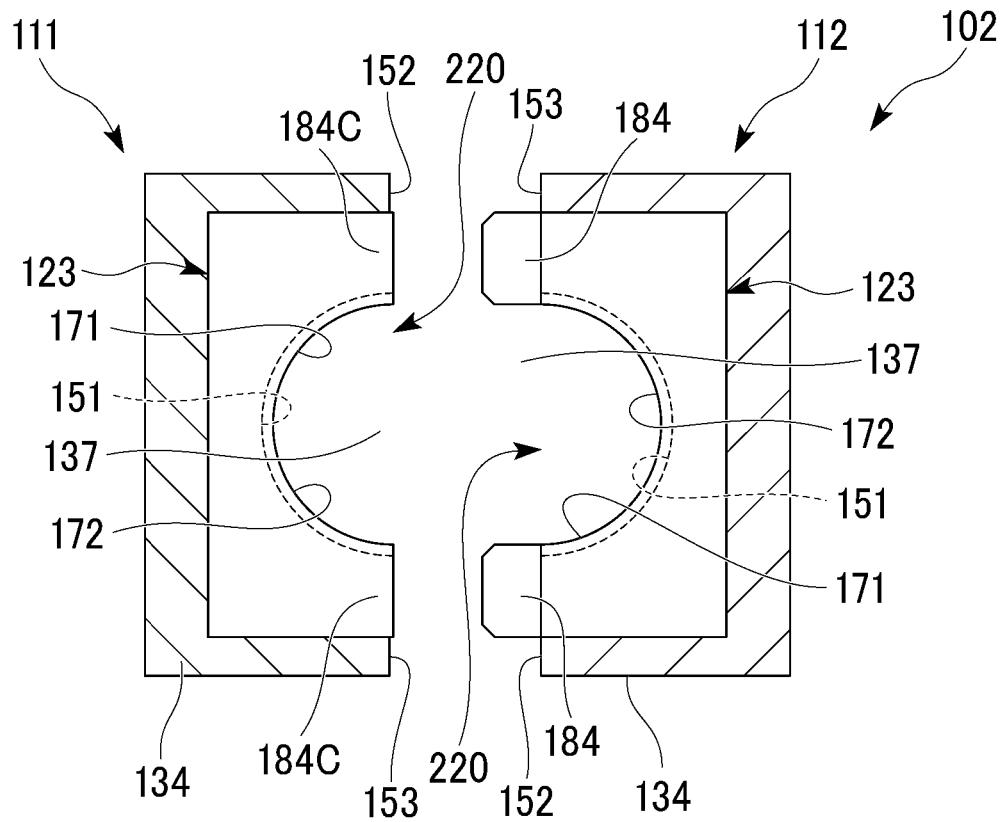
FIG. 11 is a view illustrating modified example 2 of the seal state detection device and is a plan sectional view corresponding to FIG. 3.
Figure 12:
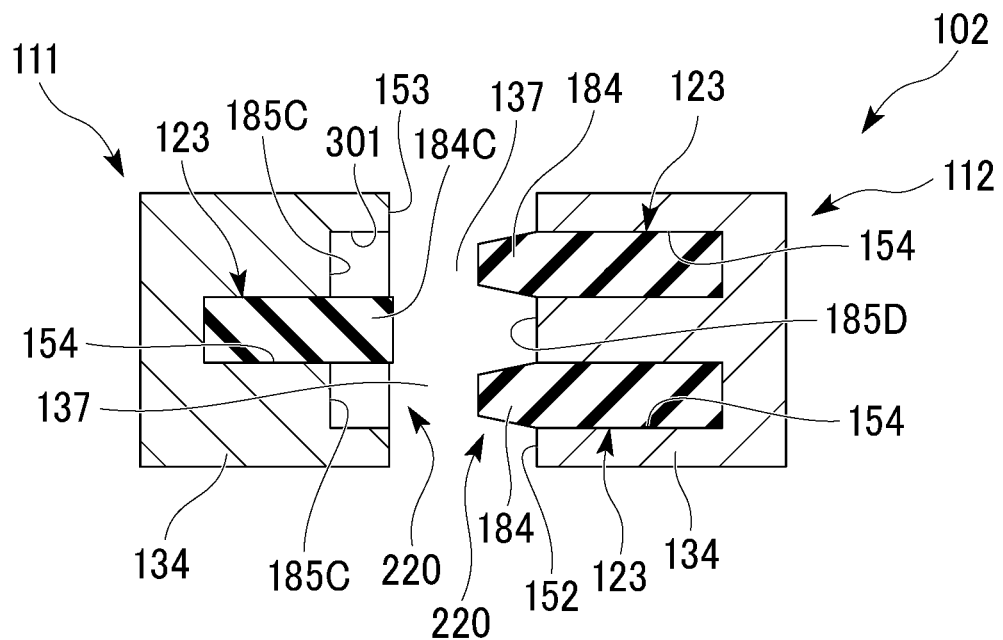
FIG. 12 is a view illustrating modified example 2 and is a partial longitudinal sectional view corresponding to FIG. 7.
Figure 13:
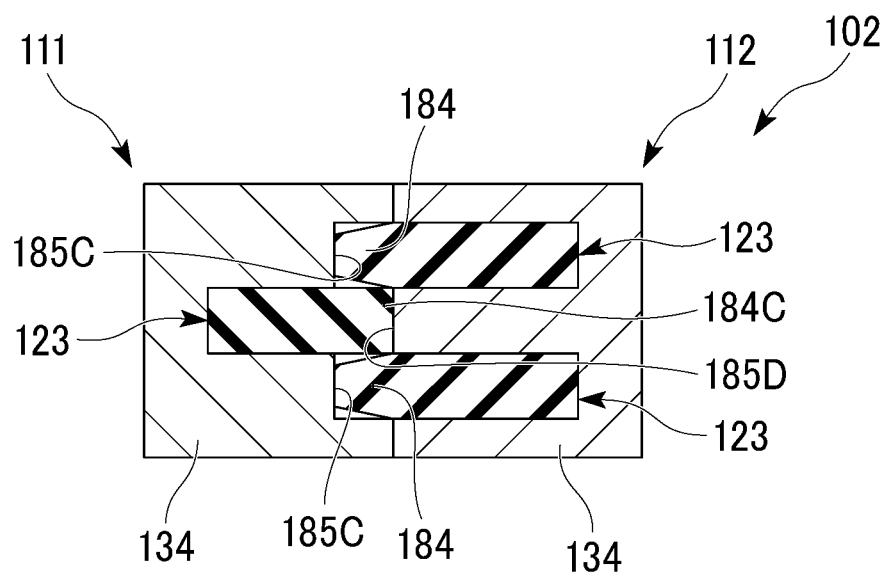
FIG. 13 is a view illustrating modified example 2 and is a partial longitudinal sectional view corresponding to FIG. 12.

In modified example 2 illustrated in FIGS. 11 to 13, the inlet recessed part 301 and the cylinder seal fitting recessed part 154 similar to those in modified example 1 are formed in the cylinder facing flange part 134 of the part case member 111.

In modified example 2, the part case member 112 does not include the inlet recessed part 301 and includes two cylinder seal fitting recessed parts 154, that are recessed from intermediate positions of the cylinder facing surface 151 in the axial direction, formed on the distal end surfaces 152 and 153. The two cylinder seal fitting recessed parts 154 of the part case member 112 are disposed on both sides of one cylinder seal fitting recessed part 154 of the part case member 111 in the axial direction of the cylinder facing surface 151.

In modified example 2, the cylinder seal 123 without the protruding parts 184 on both sides in modified example 1 is fitted into the cylinder seal fitting recessed part 154 of the part case member 111. Also, in modified example 2, the cylinder seal 123 of modified example 1 is fitted into the two cylinder seal fitting recessed parts 154 of the part case member 112.

In the seal part 221 of the part case member 111 in modified example 2, a portion of the cylinder seal 123 protruding from the inlet recessed part 301 is a protruding part 184C, and a portion between the inlet recessed part 301 and the protruding part 184C is a recessed part 185C. Therefore, there are two recessed parts 185C. As a result, the seal part 221 of the part case member 111 includes one protruding part 184C and two recessed parts 185C formed at one end, and two recessed parts 185C and one protruding part 184C formed at the other end.

Also, the seal part 221 of the part case member 112 in modified example 2, a portion between the protruding parts 184 of two cylinder seals 123 is a recessed part 185D. Therefore, there are two protruding parts 184. As a result, the seal part 221 of the part case member 112 includes two protruding parts 184 and one recessed part 185D formed at one end, and one recessed part 185D and two protruding parts 184 formed at the other end.

Then, in modified example 2, as illustrated in FIGS. 12 to 13, in the part case member 111, one protruding part 184C at one end is fitted into one recessed part 185D of the part case member 112 facing the protruding part 184C, and two recessed parts 185C at one end are fitted onto two protruding parts 184 of the part case member 112 facing the recessed parts 185C. Also, in the part case member 111, two recessed parts 185C at the other end are fitted onto two protruding parts 184 of the part case member 112 facing the recessed parts 185C, and one protruding part 184C at the other end is fitted into one recessed part 185D of the part case member 112 facing the recessed part 184C. In addition, the part case members 111 and 112 bring the cylinder contact parts 172 into contact with the barrel part 21. Thereby, the chamber 102 comes into close contact with the barrel part 21 without a gap over the entire circumference.

MODIFIED EXAMPLE 3

Figure 14:
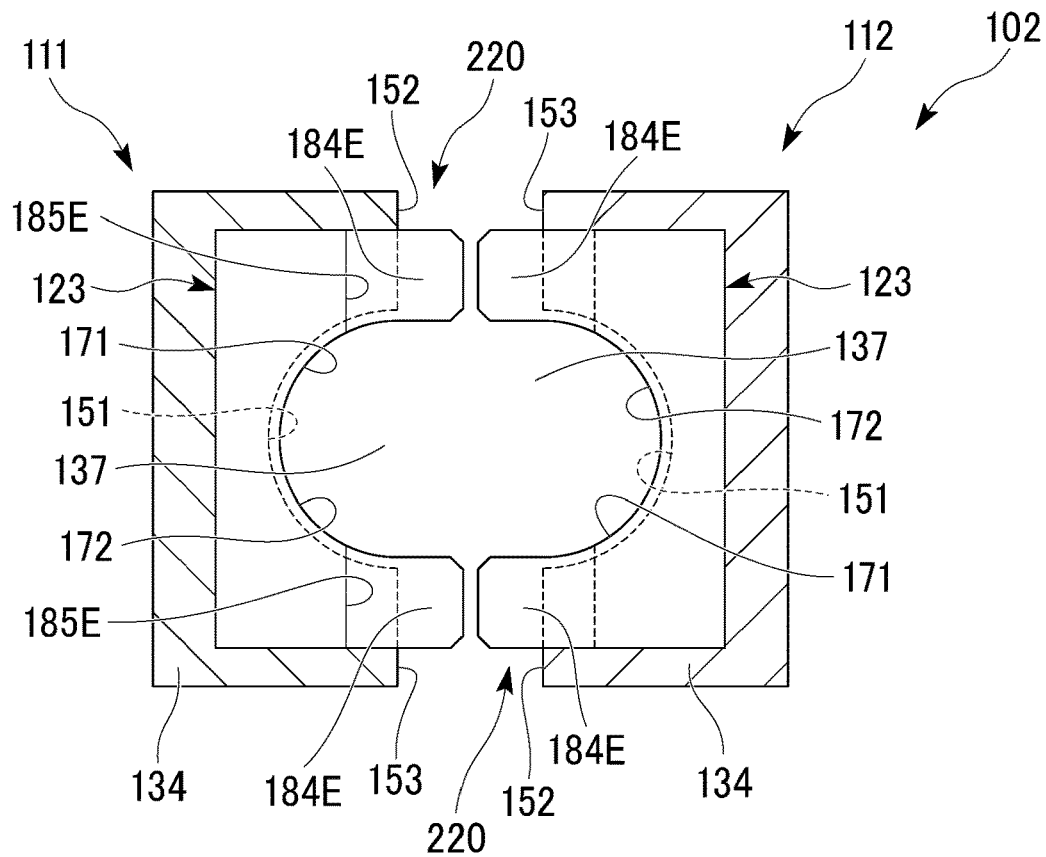
FIG. 14 is a view illustrating modified example 3 of the seal state detection device and is a plan sectional view corresponding to FIG. 3.
Figure 15:
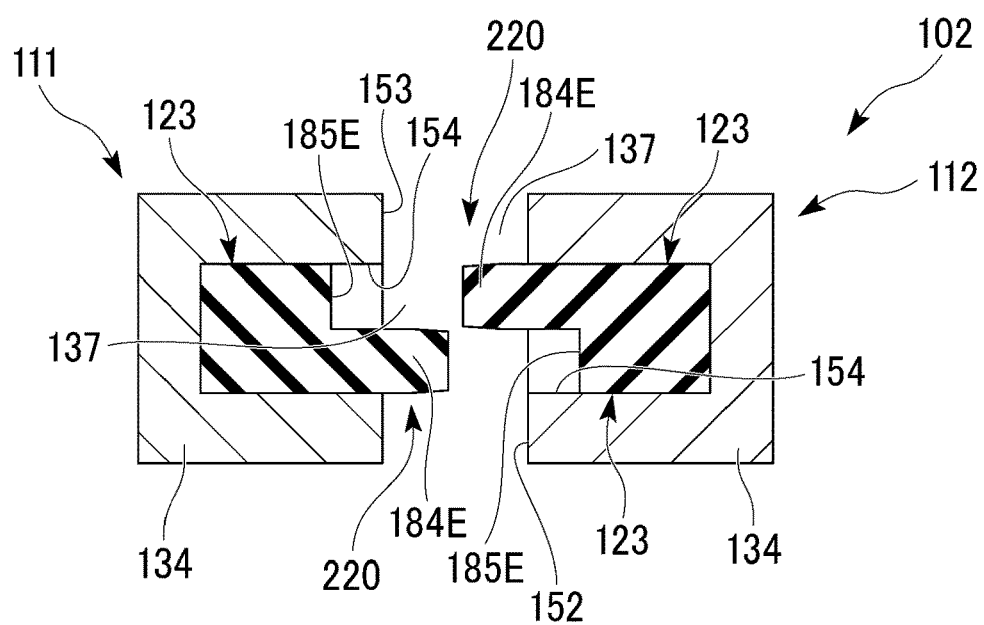
FIG. 15 is a view illustrating modified example 3 and is a partial longitudinal sectional view corresponding to FIG. 7.
Figure 16:
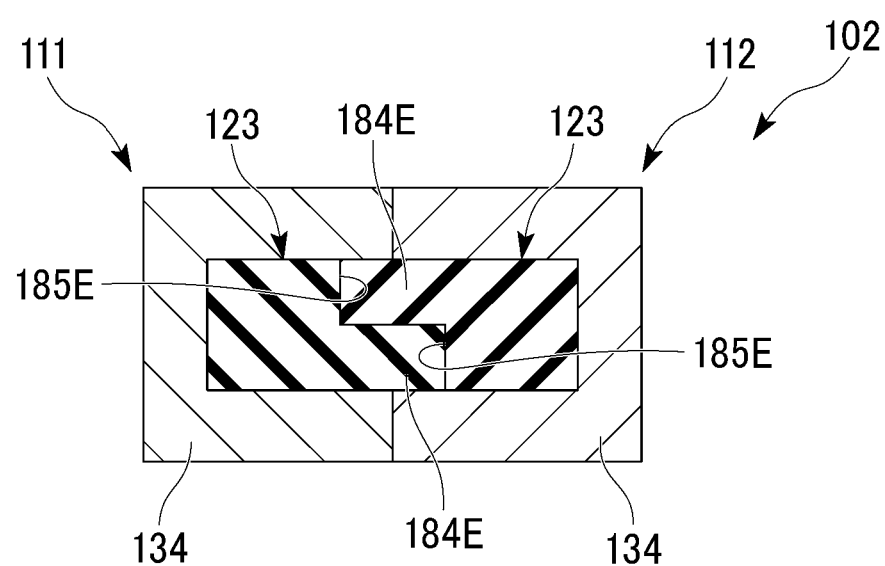
FIG. 16 is a view illustrating modified example 3 and is a partial longitudinal sectional view corresponding to FIG. 15.

In modified example 3 illustrated in FIGS. 14 to 16, the cylinder seal 123 in which a protruding part 184E is formed on both sides of the cylinder contact surface 171 in the circumferential direction to be biased to a side in the axial direction of the cylinder contact surface 171 is fitted into the cylinder seal fitting recessed part 154 of each of the part case members 111 and 112. At that time, the cylinder seal 123 of the part case member 111 and the cylinder seal 123 of the part case member 112 are provided so that the protruding parts 184E are disposed on sides opposite from each other in the axial direction of the cylinder contact surface 171.

In both the seal parts 221 of the part case members 111 and 112 in modified example 3, a portion between the cylinder seal fitting recessed part 154 and the protruding part 184E of the cylinder seal 123 is a recessed part 185E. As a result, the seal part 221 of the part case member 111 includes the protruding part 184E and the recessed part 185E formed at one end, and the recessed part 185E and the protruding part 184E formed at the other end. The seal part 221 of the part case member 112 also includes the protruding part 184E and the recessed part 185E formed at one end, and the recessed part 185E and the protruding part 184E formed at the other end.

Then, in modified example 3, as illustrated in FIGS. 15 to 16, in the part case member 111, the protruding part 184E at one end is fitted into the recessed part 185E of the part case member 112 facing the protruding part 184E, and the recessed part 185E at one end is fitted onto the protruding part 184E of the part case member 112 facing the recessed part 185E. Also, in the part case member 111, the recessed part 185E at the other end is fitted onto the protruding part 184E of the part case member 112 facing the recessed part 185E, and the protruding part 184E at the other end is fitted into the recessed part 185E of the part case member 112 facing the protruding part 184E. In addition, the part case members 111 and 112 bring the cylinder contact parts 172 into contact with the barrel part 21. Thereby, the chamber 102 comes into close contact with the barrel part 21 without a gap over the entire circumference.

Further, in the above-described embodiment, the seal state detection device 101 in which the housing chamber 231 is formed by the two part case members 111 and 112 has been exemplified, but the housing chamber may be formed by disposing three or more part case members to be aligned in the circumferential direction of the cylinder 17.

Also, in the above-described embodiment, a case of inspecting a seal state of the cylinder device 11 in which the rod 51 protrudes from only one end of the cylinder 17 to be extendable and contractible has been exemplified, but, also in a case of inspecting a cylinder device in which the rod protrudes from both ends of the cylinder to be extendable and contractible, the above-described technology can also be applied to an inspection of a seal state on each of the protruding sides of the rod. That is, an inspection target of the above-described technology is a cylinder device having a rod that protrudes from at least one end of the cylinder to be extendable and contractible.

The gist of the above-described embodiment will be summarized below.

A first aspect is a seal state detection device that detects a seal state of a seal member of a cylinder device including a cylinder in which a working fluid is sealed, a rod protruding from at least one end of the cylinder to be extendable and contractible, and the seal member provided between the cylinder and the rod, and includes a plurality of part case members having a cylinder facing part and a rod facing part and disposed to be aligned in a circumferential direction of the cylinder by causing the cylinder facing part to face the cylinder and the rod facing part to face the rod so that a housing chamber for housing a part of the cylinder and a part of the rod is formed between the cylinder facing part and the rod facing part, in which the cylinder facing part includes a seal part that comes into contact with the cylinder, the seal part includes a protruding part formed at one end and a recessed part formed at the other end in the circumferential direction of the cylinder, and the protruding part and the recessed part facing in the circumferential direction of the cylinder are fitted to each other when the plurality of part case members are disposed to be aligned in the circumferential direction of the cylinder. According to this configuration, a degree of freedom in timing of inspection can be increased.

In a second aspect, in the first aspect described above, a protrusion dimension of the protruding part is larger than a depth dimension of the recessed part.

In a third aspect, in the first aspect or the second aspect described above, chamfered portions are provided at both ends of the protruding part.

In a fourth aspect, in any one of the first aspect to the third aspect described above, flat portions are provided at both ends of the protruding part.

In a fifth aspect, in any one of the first aspect to the fourth aspect, the seal part of each of the plurality of part case members has the same shape as each other.

A sixth aspect is a seal state detection method that detects a seal state of the seal member of the cylinder device using the seal state detection device in any one of the first aspect to the fifth aspect described above, and includes a housing chamber forming step of forming a housing chamber for housing a part of the cylinder and a part of the rod between the cylinder facing part and the rod facing part by disposing the plurality of part case members to be aligned in a circumferential direction of the cylinder, a decompression step of bringing the inside of the housing chamber into a decompressed state in which a pressure thereof is reduced by a predetermined pressure from atmospheric pressure, and an abnormality detection step of detecting an abnormality on the basis of the pressure in the housing chamber that has been brought into the decompressed state in the decompression step. According to these steps, a degree of freedom in timing of inspection can be increased.

INDUSTRIAL APPLICABILITY

According to the aspects of the present invention, it is possible to provide a seal state detection device and a seal state detection method in which a degree of freedom in timing of inspection can be increased. Therefore, industrial applicability is high.

REFERENCE SIGNS LIST

11 Cylinder device
17 Cylinder
31 Seal member
51 Rod
101 Seal state detection device
111, 112 Part case member
165 Rod facing part
184 Protruding part
185 Recessed part
201, 202 Chamfered portion
205, 206 Flat portion
220 Cylinder facing part
221 Seal part
231 Housing chamber

The invention claimed is:

1. A seal state detection device detecting a seal state of a seal member of a cylinder device including: a cylinder in which a working fluid is sealed; a rod protruding from at least one end of the cylinder to be extendable and contractible; and the seal member provided between the cylinder and the rod, the seal state detection device comprising: a plurality of part case members, wherein each of the part case members includes a cylinder facing part and a rod facing part and disposed to be aligned in a circumferential direction of the cylinder by causing the cylinder facing part to face the cylinder and the rod facing part to face the rod so that a housing chamber for housing a part of the cylinder and a part of the rod is formed between the cylinder facing part and the rod facing part, wherein each of the cylinder facing parts includes a seal part which comes into contact with the cylinder, the seal part includes a protruding part formed at one end and a recessed part formed at the other end in the circumferential direction of the cylinder, and the protruding parts and the recessed parts facing in the circumferential direction of the cylinder are fitted to each other when the plurality of part case members are disposed to be aligned in the circumferential direction of the cylinder.

2. The seal state detection device according to claim 1, wherein a protrusion dimension of the protruding part is larger than a depth dimension of the recessed part.

3. The seal state detection device according to claim 1, wherein chamfered portions are provided at both ends of the protruding part.

4. The seal state detection device according to claim 1, wherein flat portions are provided at both ends of the protruding part.

5. The seal state detection device according to claim 1, wherein the seal parts of the plurality of part case members have the same shape as each other.

6. A seal state detection method for detecting a seal state of the seal member of the cylinder device using the seal state detection device according to claim 1, the seal state detection method comprising: a housing chamber forming step of forming a housing chamber for housing a part of the cylinder and a part of the rod between the cylinder facing part and the rod facing part by disposing the plurality of part case members to be aligned in a circumferential direction of the cylinder;

a decompression step of bringing an inside of the housing chamber into a decompressed state in which a pressure thereof is reduced by a predetermined pressure from atmospheric pressure; and an abnormality detection step of detecting an abnormality on the basis of the pressure in the housing chamber which has been brought into the decompressed state in the decompression step.

* * * * *